(12) United States Patent
Floratou et al.

(10) Patent No.: US 11,775,862 B2
(45) Date of Patent: Oct. 3, 2023

(54) TRACKING PROVENANCE IN DATA SCIENCE SCRIPTS

(71) Applicant: Microsoft Technology Licensing, LLC, Redmond, WA (US)

(72) Inventors: Avrilia Floratou, Mountain View, CA (US); Ashvin Agrawal, Cupertino, CA (US); MohammadHossein Namaki, Pullman, WA (US); Subramaniam Venkatraman Krishnan, Santa Clara, CA (US); Fotios Psallidas, Bellevue, WA (US); Yinghui Wu, Cleveland, OH (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 896 days.

(21) Appl. No.: 16/742,480

(22) Filed: Jan. 14, 2020

(65) Prior Publication Data
US 2021/0216905 A1 Jul. 15, 2021

(51) Int. Cl.
*G06N 20/00* (2019.01)
*G06N 5/02* (2023.01)
*G06F 16/903* (2019.01)
*G06F 9/54* (2006.01)

(52) U.S. Cl.
CPC ............... *G06N 20/00* (2019.01); *G06F 9/54* (2013.01); *G06F 16/903* (2019.01); *G06N 5/02* (2013.01)

(58) Field of Classification Search
CPC ........ G06N 20/00; G06N 5/02; G06F 16/903; G06F 9/54

USPC .......................................................... 706/12
See application file for complete search history.

(56) References Cited

U.S. PATENT DOCUMENTS

| | | | |
|---|---|---|---|
| 9,996,804 B2* | 6/2018 | Bowers | G06N 20/00 |
| 11,301,244 B1* | 4/2022 | Trim | G06K 9/6215 |
| 2016/0162569 A1* | 6/2016 | Erle | G06F 16/93 |
| | | | 707/739 |
| 2016/0300156 A1* | 10/2016 | Bowers | G06F 16/2465 |

(Continued)

OTHER PUBLICATIONS

Renan Souza et al., Provenance Data in the Machine Learning Lifecycle in Computational Science and Engineering, published Oct. 21, 2019 via arXiv, pp. 1-10 (pdf).*

(Continued)

*Primary Examiner* — Manglesh M Patel
(74) *Attorney, Agent, or Firm* — Weaver IP L.L.C.

(57) ABSTRACT

A system enables tracking machine learning ("ML") model data provenance. In particular, a computing device is configured to accept ML model code that, when executed, instantiates and trains an ML model, to parse the ML model code into a workflow intermediate representation (WIR), to semantically annotate the WIR to provide an annotated WIR, and to identify, based on the annotated WIR and ML API corresponding to the ML model code, data from at least one data source that is relied upon by the ML model code when training the ML model. A WIR may be generated from an abstract syntax tree (AST) based on the ML model code, generating provenance relationships (PRs) based at least in part on relationships between nodes of the AST, wherein a PR comprises one or more input variables, an operation, a caller, and one or more output variables.

20 Claims, 13 Drawing Sheets

(56) References Cited

U.S. PATENT DOCUMENTS

| | | | | |
|---|---|---|---|---|
| 2018/0124197 | A1* | 5/2018 | Srivastava | H04L 67/10 |
| 2018/0341667 | A1* | 11/2018 | Gluzman Peregrine | |
| | | | | G06F 16/219 |
| 2019/0378052 | A1* | 12/2019 | Badhwar | G06N 20/00 |
| 2021/0279566 | A1* | 9/2021 | Lin | G06F 18/23 |
| 2021/0342321 | A1* | 11/2021 | Jacob Sushil | G06F 16/1734 |
| 2022/0261299 | A1* | 8/2022 | Dhondse | G06F 30/20 |
| 2023/0054663 | A1* | 2/2023 | Wu | G06F 16/24573 |

OTHER PUBLICATIONS

Christian Kastner, Versioning, Provenance, and Reproducibility in Production Machine Learning, published Feb. 15, 2021 via ckaestne. medium.com, pp. 1-23 (pdf).*
Hongfa Xue et al., Machine-Learning-based Analysis of Program Binaries: A Comprehensive Study, published 2016, vol. 4 via IEEE, pp. 1-25 (pdf).*
Mohammad Hossein Namaki et al., Vamsa: Tracking Provenance in Data Science Scripts, published Jan. 7, 2020 via arXiv, pp. 1-14 (pdf).*
"2018 Kaggle ML & DS Survey", Retrieved from: https://www.kaggle.com/kaggle/kaggle-survey-2018, 2018, 5 Pages.
"Abstract Syntax Trees", Retrieved from: https://web.archive.org/web/20191020202631/https://docs.python.org/3/library/ast.html, Oct. 20, 2019, 11 Pages.
"EU data protection rules", Retrieved from: https://ec.europa.eu/info/priorities/justice-and-fundamental-rights/data-protection/2018-reform-eu-data-protection-rules/eu-data-protection-rules_en, May 2018, 11 Pages.
"Green Tree Snakes—the missing Python AST docs", Retrieved from: https://web.archive.org/web/20191008012030/https://greentreesnakes.readthedocs.io/en/latest/, Oct. 8, 2019, 2 Pages.
"Heart Disease UCI", Retrieved from: https://web.archive.org/web/20190213115402/https://www.kaggle.com/ronitf/heart-disease-uci, Feb. 13, 2019, 3 Pages.
"PyTorch", Retrieved from: https://web.archive.org/web/20190101155119/https://pytorch.org/, Jan. 1, 2019, 3 Pages.
"The HIPAA Privacy Rule", Retrieved from: https://web.archive.org/web/20181114032151/https://www.hhs.gov/hipaa/for-professionals/privacy/index.html, Nov. 14, 2018, 4 Pages.
"Turi", Retrieved from: https://web.archive.org/web/20130228064114/https://turi.com/, Feb. 28, 2013, 3 Pages.
"Welcome to LightGBM's documentation!", Retrieved from: https://web.archive.org/web/20170513070544/https://lightgbm.readthedocs.io/en/latest/, May 13, 2017, 2 Pages.
"XGBoost Documentation", Retrieved from: https://web.archive.org/web/20191123134115/https://xgboost.readthedocs.io/en/latest/index.html, Nov. 2019, 3 Pages.
Agrawal, et al., "Cloudy with high chance of DBMS: A 10-year prediction for Enterprise-Grade ML", In Journal of Computing Research Repository, Sep. 2019, 8 Pages.
Altintas, et al., "Provenance collection support in the kepler scientific workflow system", In Proceedings of the International conference on Provenance and Annotation of Data, May 2006, 15 Pages.
Angelino, et al., "Provenance integration requires reconciliation", In Proceedings of the Third Workshop on the Theory and Practice of Provenance, Jun. 2011, 7 Pages.
Angelino, et al., "StarFlow: A script-centric data analysis environment", In Proceedings of the Third International Provenance and Annotation Workshop, Jun. 15, 2010, 15 Pages.
Bose, et al., "Lineage retrieval for scientific data processing: a survey", In ACM Computing Surveys (CSUR), Mar. 2005, pp. 1-28.
Buneman, et al., "Why and where: A characterization of data provenance", In International conference on database theory, Jan. 4, 2001, 17 Pages.
Chen, et al., "Data provenance at internet scale: architecture, experiences, and the road ahead", In 8th Biennial Conference on Innovative Data Systems Research, Jan. 8, 2017, pp. 1-7.

Cheney, et al., "Provenance in Databases: Why, How, and Where", In Foundations and Trends in Databases vol. 1, No. 4, Jun. 2, 2009, pp. 379-474.
Chiticariu, et al., "DBNotes: A post-it system for relational databases based on provenance", In Proceedings of the ACM SIGMOD international conference on Management of data, Jun. 14, 2005, 3 Pages.
Cooper, et al., "Engineering A Compiler", In Publication of Morgan Koffman, 2012, 825 Pages.
Cui, et al., "Tracing the Lineage of View Data in a Warehousing Environment", In Journal of ACM Transactions on Database Systems, vol. 25, Issue 2, Jun. 1, 2000, pp. 179-227.
Davidson, et al., "Provenance and scientific workflows: challenges and opportunities", In Proceedings of the ACM SIGMOD international conference on Management of data, Jun. 2008, pp. 1345-1350.
Deutch, et al., "Provenance for natural language queries", In Proceedings of the VLDB Endowment, vol. 10, Issue 5, Jan. 2017, pp. 577-588.
Freire, et al., "Provenance in Scientific Workflow Systems", In IEEE Data Engineering Bulletin, Jan. 2007, pp. 1-7.
Garcia, et al., "Context: The missing piece in the machine learning lifecycle", In KDD CMI Workshop, Aug. 20, 2018, 4 Pages.
Green, et al., "Provenance Semirings", In Proceedings of the twenty-sixth ACM SIGMOD-SIGACT-SIGART symposium on Principles of database systems, Jun. 11, 2007, pp. 31-40.
Guedes, et al., "A Practical Roadmap for Provenance Capture and Data Analysis in Spark-based Scientific Workflows", In Proceedings of IEEE/ACM Workflows in Support of Large-Scale Science (WORKS), Nov. 11, 2018, 11 Pages.
Heinis, et al., "Efficient lineage tracking for scientific workflows", In Proceedings of the ACM SIGMOD international conference on Management of data, Jun. 2008, pp. 1007-1018.
Herschel, et al., "Provenance: On and behind the screens", In Proceedings of the International Conference on Management of Data, Jun. 2016, pp. 2213-2218.
Ikeda, et al., "Data lineage: A survey", In Technical Report, Stanford InfoLab, 2009, 9 Pages.
Ikeda, et al., "Panda: A System for Provenance and Data", Bulletin of the IEEE Computer Society Technical Committee on Data Engineering, 2010, pp. 1-4.
Interlandi, et al., "Titian: data provenance support in Spark", In Proceedings of the VLDB Endowment, vol. 9, No. 03, Nov. 2015, pp. 216-227.
Ives, et al., "Dataset Relationship Management", In the biennial Conference on Innovative Data Systems Research, Jan. 2019, 7 Pages.
Karvounarakis, et al., "Querying data provenance", In Proceedings of the ACM SIGMOD International Conference on Management of data, Jun. 6, 2010, pp. 951-962.
Logothetis, et al., "Scalable lineage capture for debugging disc analytics", In Proceedings of the 4th annual Symposium on Cloud Computing, Oct. 2013, 15 Pages.
McKinney, Wes, "Pandas: a foundational Python library for data analysis and statistics", In Python for High Performance and Scientific Computing, vol. 14, Issue 09, Nov. 18, 2011, pp. 1-9.
McPhillips, et al., "YesWorkflow: A User-Oriented, Language-Independent Tool for Recovering Workflow Information from Scripts", In International Journal of Digital Curation, vol. 10, No. 01, Feb. 9, 2015, pp. 298-313.
Meng, et al., "MLlib: Machine Learning in Apache Spark", In Journal of Machine Learning Research, vol. 17, Issue 1, Jan. 1, 2016, 7 Pages.
Miao, et al., "ProvDB: Provenance-enabled Lifecycle Management of Collaborative Data Analysis Workflows", In IEEE Data Eng. Bull, vol. 41, Issue 4, 2018, pp. 26-38.
Miao, et al., "Towards Unified Data and Lifecycle Management for Deep Learning", In 33rd IEEE International Conference on Data Engineering, Apr. 19, 2017, 13 Pages.
Missier, et al., "Fine-grained and efficient lineage querying of collection-based workflow provenance", In Proceedings of the 13th International Conference on Extending Database Technology, Mar. 22, 2010, 12 Pages.

(56) References Cited

OTHER PUBLICATIONS

Mitchell, Mackenzie, "Programming Languages for Data Scientists", Retrieved from: https://towardsdatascience.com/programming-languages-for-data-scientists-afde2eaf5cc5, Sep. 24, 2019, 12 Pages.

Murta, et al., "noWorkflow: Capturing and Analyzing Provenance of Scripts?", In International Provenance and Annotation Workshop, Jun. 9, 2014, pp. 1-13.

Namaki, et al., "Answering Why-questions by Exemplars in Attributed Graphs", In Proceedings of the International Conference on Management of Data, Jun. 2019, pp. 1481-1498.

Pedregosa, et al., "Scikit-learn: Machine Learning in Python", In Journal of Machine Learning Research, vol. 12, Oct. 2011, pp. 2825-2830.

Pimente, et al., "A Survey on Collecting, Managing, and Analyzing Provenance from Scripts", In ACM Computing Surveys (CSUR), vol. 52, No. 3, Jun. 2019, 38 Pages.

Pimentel, "noworkflow: a tool for collecting, analyzing, and managing provenance from python scripts", In Proceedings of the VLDB Endowment, vol. 10, No. 12, Aug. 2017, pp. 1841-1844.

Prokhorenkova, et al., "Catboost: unbiased boosting with categorical features", In 32nd Conference on Neural Information Processing Systems, Dec. 3, 2018, 11 Pages.

Psallidas, et al., "Provenance for Interactive Visualizations", In Proceedings of the Workshop on Human-In-the-Loop Data Analytics, Jun. 10, 2018, 8 Pages.

Psallidas, et al., "Smoke: fine-grained lineage at interactive speed", In Proceedings of the VLDB Endowment, vol. 11, No. 6, Feb. 2018, pp. 719-732.

Ragan, et al., "Characterizing provenance in visualization and data analysis: an organizational framework of provenance types and purposes", In IEEE Transactions on Visualization and Computer Graphics, vol. 22, Issue 1, Jan. 2016, pp. 31-40.

Ruan, et al., "Fine-grained, secure and efficient data provenance on blockchain systems", In Proceedings of the VLDB Endowment, vol. 12, No. 9, May 2019, pp. 975-988.

Rule, et al., "Exploration and Explanation in Computational Notebooks", In Proceedings of the CHI Conference on Human Factors in Computing Systems, Apr. 21, 2018, pp. 1-12.

Schelter, et al., "Automatically Tracking Metadata and Provenance of Machine Learning Experiments", In Machine Learning Systems workshop, Dec. 4, 2017, pp. 1-8.

Schelter, et al., "On challenges in machine learning model management", In IEEE Data Eng. Bull., vol. 41, Issue 4, 2018, pp. 5-15.

Schwartz, et al., "The PII problem: Privacy and a new concept of personally identi?able information", In?New York University law review, Revision 86, vol. 6, Dec. 2011, pp. 1814-1894.

Seabold, et al., "Statsmodels: Econometric and statistical modeling with python", In Proceedings of the 9th Python in Science Conference, vol. 57, Jun. 28, 2010, pp. 57-61.

Shao, et al., "Griffon: Reasoning about Job Anomalies with Unlabeled Data in Cloud-based Platforms", In Proceedings of the ACM Symposium on Cloud Computing, Nov. 2019, pp. 441-452.

Simmhan, et al., "A survey of data provenance in e-science", In ACM SIGMOD Record, vol. 34, Issue 3, Sep. 2005, pp. 31-36.

Tukey, John W.., "We Need Both Exploratory and Confirmatory", In the American Statistician, vol. 34, No. 1, Feb. 1980, pp. 23-25.

Vartak, et al., "Mistique: A System to Store and Query Model Intermediates for Model Diagnosis", In Proceedings of the International Conference on Management of Data, Jun. 10, 2018, pp. 1285-1300.

Vartak, et al., "ModelDB: A System for Machine Learning Model Management", In Proceedings of the Workshop on Human-In-the-Loop Data Analytics, Jun. 26, 2016, 3 Pages.

Wu, et al., "Scorpion: Explaining Away Outliers in Aggregate Queries", In Proceedings of the VLDB Endowment, vol. 6, Issue 8, Jun. 1, 2013, pp. 553-564.

Ysteboe, et al., "Kaggle API", Retrieved from: https://github.com/Kaggle/kaggle-api, Jan. 21, 2018, 20 Pages.

\* cited by examiner

800

Traverse the AST starting at each root node of the AST and for each node of the AST that is not a literal or constant, determining an operation corresponding to the node, and recursively determining each one or more inputs, a caller and one or more outputs corresponding to the node, wherein the determined operation, one or more inputs, caller and one or more outputs together comprise a generated PR. — 802

For each PR in the directed graph, determine feature variables comprising variables of the PR that are annotated as features and that correspond to a data selection or exclusion operation, and beginning with the PR of each determined feature variable, recursively traverse the directed graph backwards to identify the data from the at least one data source that corresponds to the feature variable.

TRACKING PROVENANCE IN DATA SCIENCE SCRIPTS

BACKGROUND

Machine learning (ML) which was initially adopted for search ranking and recommendation systems has firmly moved into the realm of core enterprise operations like sales optimization and preventative healthcare. For such ML applications, often deployed in regulated environments, the standards for user privacy, security, and data governance are substantially higher. In particular, various data protection statutes and regulations such as, for example, the Health Insurance Portability and Accountability Act ("HIPPA") in the United States, or the General Data Protection Regulation ("GDPR") of the European Union, impose strict limitations on how and when personal data may be used in ML models.

Avoiding staleness in ML models deployed in production is a crucial concern for many applications. Data that forms the basis of a trained ML model may become unreliable or data patterns may have change over time. Moreover, ML models may contain errors or be inefficiently constructed. For example, it is possible that ML model code used to populate data included some bug which caused faulty data to be incorporated into one or more ML models. Upon discovery of the bug, one may wish to know which ML models were built based on the faulty data and take appropriate action.

Similarly, one might want to investigate whether the feature set of an ML model should be updated, once new dimensions have been added in the data. Similarly, an important aspect of model debugging is to understand whether decreased model quality can be attributed to the original data sources. For example, a data scientist while debugging her code might eventually find that the ML model is affected by a subset of the data that contains 0 values for a particular feature. In such scenarios, one needs to automatically track the original data sources used to produce the model and evaluate whether they also contain 0 values.

The aforementioned scenarios motivate the need for tracking ML model data provenance end-to-end, from the data sources used for training ML models to the predictions of the deployed ML models.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and computer program products are described herein that enable tracking machine learning ("ML") model data provenance.

In an example aspect, a computing device is configured to accept ML model code that, when executed, instantiates and trains an ML model, to parse the ML model code into a workflow intermediate representation (WIR), to semantically annotate the WIR to provide an annotated WIR, and to identify, based on the annotated WIR and ML API corresponding to the ML model code, data from at least one data source that is relied upon by the ML model code when training the ML model.

In a further aspect, embodiments are configured to generate a WIR from ML model code by building an abstract syntax tree (AST) based on the ML model code, generate provenance relationships (PRs) based at least in part on relationships between nodes of the AST, wherein a PR comprises one or more input variables, an operation, a caller, and one or more output variables, and compose a directed graph based at least in part on the plurality of PRs, wherein the WIR comprises the directed graph.

In another aspect, embodiments are configured to generate PRs by traversing the AST starting at each root node of the AST and for each node of the AST that is not a literal or constant, determining an operation corresponding to the node, and recursively determining each one or more inputs, a caller and one or more outputs corresponding to the node, wherein the determined operation, one or more inputs, caller and one or more outputs together comprise a generated PR.

In a further aspect, embodiments are configured to semantically annotate the WIR by accessing a knowledge base (KB) that includes ML API annotations embodying semantic relationships between the PRs of the WIR, and recursively traversing the PRs of the WIR in the forward and backward directions to propagate such annotations as appropriate.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 8 depicts a flowchart of a refinement to the flowchart of FIG. 7 for generating a plurality of provenance relationships ("PRs"), according to an embodiment.

FIG. 10 depicts a flowchart of a refinement to the flowchart of FIG. 9 for identifying data relied upon by ML model code, according to an embodiment.

Figure 1:
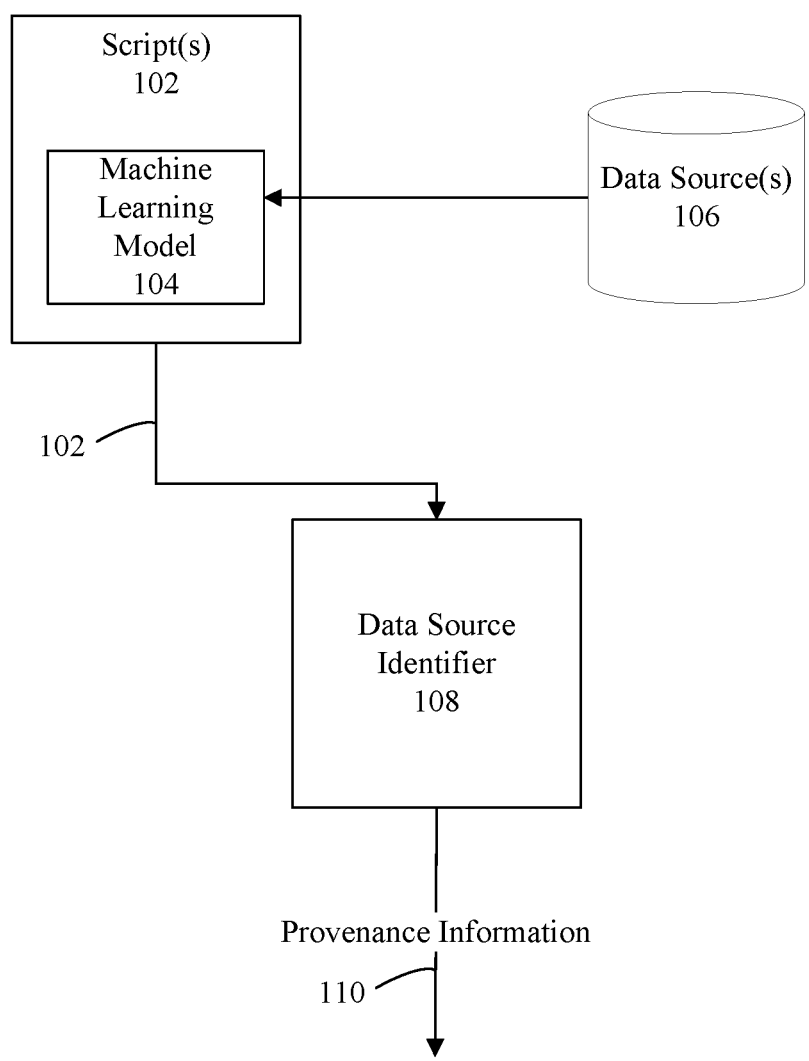
FIG. 1 depicts an example system including a data source identifier for tracking ML model data provenance, according to an embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Machine learning (ML) has proven itself in multiple consumer applications such as web ranking and recommendation systems. In the context of enterprise scenarios, ML is emerging as a compelling tool in a broad range of applications such as marketing/sales optimization, process automation, preventative healthcare, and automotive predictive maintenance, among others.

For such enterprise-grade ML applications, often deployed in regulated environments, the standards for user privacy, security, and explainability are substantially higher which now must be extended to ML models. Consider the following scenarios:

Compliance: The protection of personal data is crucial for organizations due to relatively recent compliance regulations such as HIPAA and GDPR. As more emerging applications rely on ML, it is critical to ensure effective ongoing compliance in the various pipelines deployed in an organization is preserved. Thus, developing techniques that automatically verify whether the developer's data science code is compliant (e.g., tools that determine if the features used to build a machine learning model are derived from sensitive data such as personally identifiable information (PII)) is an immediate priority in the enterprise context.

Reacting to data changes: Avoiding staleness in the ML models deployed in production is a crucial concern for many applications. To this end, detecting which models are affected because data has become unreliable or data patterns have changed, by tracking the dependencies between data and models becomes critical. For example, it is possible that the code used to populate the data had some bug which was later discovered by an engineer. In this case, one would like to know which ML models were built based on this data and take appropriate action. Similarly, one might want to investigate whether the feature set of a ML model should be updated, once new dimensions have been added in the data.

Model debugging: Diagnosis and debugging of ML models deployed in production remain an open challenge. An important aspect of model debugging is to understand whether the decreased model quality can be attributed to the original data sources. For example, a data scientist while debugging her code might eventually find that the ML model is affected by a subset of the data which contains 0 values for a particular feature. In such scenarios, one needs to automatically track the original data sources used to produce this model and evaluate whether they also contain 0 values.

The ability to react to data change and debug models enables model optimization whereby, for example, the overall size of a model may be reduced, and/or the training data set may be reduced. Such model size and training data reductions are generally desirable due to the reduced storage, processing needs and network needs. Modern ML models can require vast amounts of processing power for training, requiring large distributed training systems with many network connected training machines operating in parallel. Reduction of model size and elimination of redundant model features can dramatically improve the training performance of such distributed systems, since the overall system will require less storage, CPU processing power and network bandwidth.

The aforementioned scenarios motivate the need for tracking provenance end-to-end, from the data sources used for training ML models to the predictions of the deployed ML models. Embodiments disclosed herein automatically identify the relationships between data and ML models in a data science script and, more specifically, may track which columns (or rows, or cells) in a dataset have been used to derive the features (and optionally labels) used to train a ML model. Consider, for example, the Python script shown herein below:

| Script 1: A data science ML script written in Python |
| --- |

```
      # importing libraries and modules
 1:   import catboost as cb
 2:   from sklearn.model_selection import train_test_split
 3:   import pandas as preferred datacenter 214
      #reading from a data source
 4:   train_df = pd.read_csv('heart_disease.csv')
      # selecting features and specifying ground truth
 5:   train_df2 = train_df.iloc[:, 3:].values
 6:   train_x = train_df2.drop( ['SSN', 'Target'], axis=1)
 7:   train_y = train_df2['Target']
      # splitting the training data to train and validation
 8:   train_x2, val_x2, train_y2, val_y2 =
          train_test_split(train_x, train_y, test_size=0.20)
      # initializing a model
 9:   clf = cb.CatBoostClassifier(eval_metric="AUC",
          iterations=40)
      # training the model
10:   clf.fit(train_x2, train_y2, eval_set=)val_x2, val_y2))
```

Script 1 was created in the context of a ML competition related to predicting heart disease. The script trains a ML model using a patient dataset from a U.S. hospital. The model takes as input a set of features such as Age, Blood pressure, and Cholesterol, and predicts whether a patient might have a heart disease in the future. As described in detail herein below, embodiments, accept Script 1 as input, and not only detects that the script trains a ML model but also that the columns Target and SSN from the heart disease.csv dataset are not used to derive the model's features. This detailed description continues with a brief introduction to the concepts and premises underlying implementation of embodiments.

A Data Source D can be a database table/view, a spreadsheet, or any other external files that may typically be used in Python scripts to access the input data e.g., hdf5, npy. Note, although embodiments discussed herein are generally described in terms of Python scripts and related ML programming API since Python is the major language currently used by data scientists. However, and as will be discussed in further detail below, it should be understood that other programming platforms and languages may instead be used in embodiments.

A common ML pipeline accesses data source D and learns a ML model M with two steps. First, feature engineering is conducted to extract a set of training samples from D to be used to train the model M The training samples consist of features and labels that are both derived from selected columns in D by, e.g., transformation functions. The training process then derives the model M by optimizing a learning objective function determined by the training samples and specific predictive or descriptive needs.

A data science script (e.g., Script 1 as shown above) reads from a set of data sources D (NOTE: D may include only a single data source) and trains one or more machine learning models M. Given the above definitions, more formally, embodiments described herein may be configured to find all triples (M, D, C) where M∈M is a constructed machine learning model trained in the script using data source D. In particular, the model is trained using features (and optionally labels) derived from a subset of columns of data source D, denoted as C. The goal is to identify each trained model Min the script, its data source D, and the columns C that were used to train model M.

For example, FIG. 1 depicts an example system 100 including a data source identifier 108 for tracking ML model data provenance, according to an embodiment. System 100 includes script 102, data source 106 and data source identifier 108. Script 102, as described above, is configured to generate ML model 104, select data from data source 106, and thereafter train ML model 104 with such data. In the context of the above described formalism, data source identifier 108 may be configured to find all triples (M, D, C) for script 102, with such triples comprising provenance information 110, the output of data source identifier 108. For example, and with reference to Script 1 above, the script reads from heart disease.csv as a data source D and trains an ensemble of decision trees using catboost library (i.e., a ML model gradient boosting on decision trees programming library). In Script 1, only a single model was trained. Also, not all the columns of the data source have been used to derive the model's features and labels. To select the features, in the script, a range of columns [3, +∞) from D is explicitly extracted, followed by the drop of the columns {SSN, Target}. Similarly, only the Target column was used to derive the labels. Thus, the desired output is a triple (M, D, C) where M=clf is the variable that contains the trained model, D='heart disease.csv' is the training dataset, and C is the set: [3, +∞)-{SSN}. Embodiments of data source identifier 108 automatically parse Script 1 to produce provenance information 110, the above described triple (M, D, C).

Figure 2:
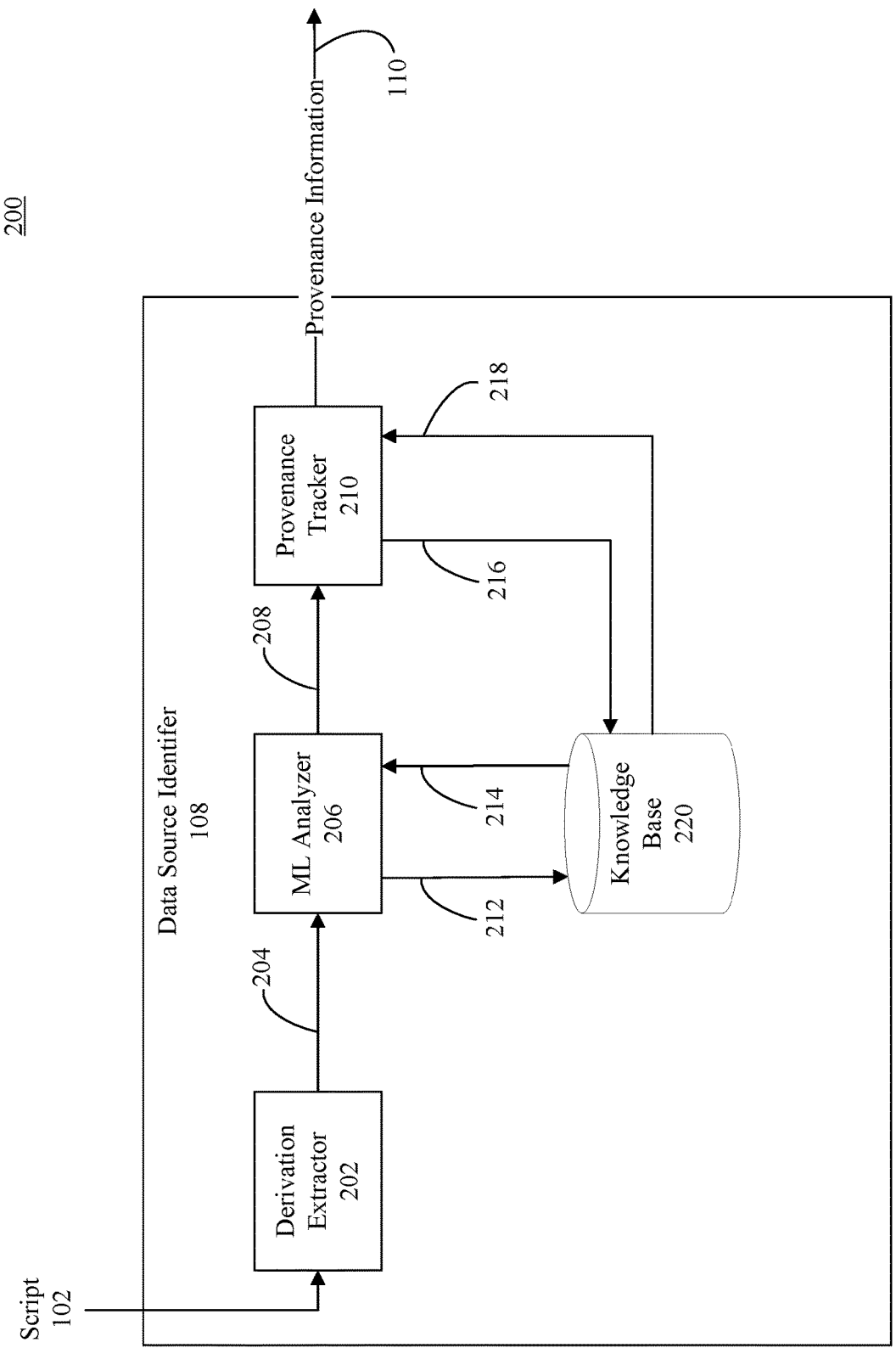
FIG. 2 depicts a detailed schematic view of an example data source identifier, according to an embodiment.

Embodiments of data source identifier 108 may be implemented in numerous ways. For example, FIG. 2 depicts a detailed schematic view 200 of an example data source identifier 108, according to an embodiment. Data source identifier 108 as depicted in FIG. 2 includes a derivation extractor 202, a ML analyzer 206, a provenance tracker 210 and a knowledge base 220. Other structural and operational embodiments will be apparent to persons skilled in the relevant art(s) based on the following discussion regarding data source identifier 108 as depicted in FIG. 2.

Data source identifier 108 as shown in FIG. 2 is configured to determine ML model data provenance in the following general manner: 1) static analysis is performed on the Python script to determine the relationships between all the variables in the script, 2) semantic information is assigned to the variables in the script, and 3) a provenance tracking algorithm extracts the feature set for all the ML models trained in the script, and provides provenance information 110. These general steps may be performed by the three major modules on data source identifier 108: derivation extractor 202, ML analyzer 206 and provenance tracker 210.

More specifically, and as will be described in more detail below, derivation extractor 202 accepts script 102 and generates a workflow intermediate representation ("WIR") 204 that is passed to ML analyzer 206. ML analyzer 206 is configured to generate an annotated WIR 208 by performing an annotation operation. The annotation operations generates queries 212 that reflect the dependencies embodied by WIR 204 and sends such queries to knowledge base 220, and receives annotations 214 in return. Upon completion of the annotation operation, ML analyzer 206 passes annotated WIR 208 to provenance tracker 210. Provenance tracker 210 determines the data sources relied upon by any models corresponding to script 102, and outputs such information as provenance information 110. Provenance tracker 210 operates in part by generating queries 216 based on certain operation nodes in the annotated WIR 208, sending queries 216 to knowledge base 220, and receiving feature selection API information 218 in return. The general operation of each of these modules will now be described, with more detailed description of embodiments following herein below.

With continued reference to FIG. 2, derivation extractor 202 generates WIR 204 of script 102 by extracting the major workflow elements including imported libraries, variables, and functions, as well as their dependencies. ML analyzer 206 annotates variables in the WIR based on their roles in the script (e.g., features, labels, and models). To that end, ML analyzer 206 performs an annotation algorithm using knowledge base 220. As described in further detail below, knowledge base 220 includes information about the various APIs of different ML libraries. Knowledge base 220 may include, for example, API information from well-known and established data science libraries such as, for example, scikit-learn, XGBoost, LightGBM, Pandas, CatBoost, StatsModels and/or Graphlab. Such information permits embodiments to declaratively introduce semantic information to Python functions which in turn permits embodiments to track data provenance in data science scripts. Knowledge base 220 may be stored in one or more suitable memory devices (including any of the memory device types discussed below in reference to FIG. 13) or storage systems.

Embodiments of provenance tracker 210 may determine a set of columns (or rows or cells) that were explicitly included in or excluded from the features/labels by using the annotated WIR and consulting knowledge base 220. Detailed operation of embodiments of derivation extractor 202, ML analyzer 206 and provenance tracker 210 will now be described in turn herein below.

Derivation extractor 202 is configured to parse script 102 and by performing static analysis, build a workflow model which captures the dependencies among the elements of the script including imported libraries, input arguments, operations that change the state of the program, and the derived output variables. This model is captured in a workflow intermediate representation ("WIR"). A WIR may be understood in terms of variables, operations and provenance relationships ("PRs").

In programming languages, variables are containers for storing data values. For the purposes of describing embodiments, let V denote the set of all variables in script 102. For instance, and with reference to Script 1 above, catboost, cb, train_df are a few examples of variables in V. An operation p operates on an ordered set of input variables I to change the state of the program and/or to derive an ordered set of output variables O. An operation may be called by a variable, denoted as caller c. While an operation may have multiple inputs/outputs, it has at most one caller.

For example, and with continued reference to Script 1 above, the import statements, read_csv(·) in line 4, attribute values in line 5, CatBoostClassifier(·) in line 9, and fit(·) in lie 10 are examples of operations. The fit(·) operation in line 10 is invoked by the clf variable and takes three arguments namely, features and labels, and an evaluation set. While the fit(·) operation does not explicitly produce an output variable, it changes the state of the variable clf from model to trained model.

An invocation of an operation p (by an optional caller c) embodies a provenance relationship (PR). A PR is represented as a quadruple (I, c, p, O), where I is an ordered set of input variables, (optional) variable c refers to the caller object, p is the operation, and O is an ordered set of output variables that was derived from this process. A PR can be represented as a labeled directed graph, which includes (1) a set of input edges (labeled as 'input_edge'), where there is an input edge (v, p) for each v∈I, (2) a caller edge (labeled as 'caller_edge') (c, p) if p is called by c, and (3) a set of output edges (labeled as 'output_edge'), where there is an output edge (p, v) for each v∈O. For consistency, e create a temporary output variable for the operations that do not explicitly generate one.

PRs are composed together to form a WIR G, which is a directed graph that represents the sequence and dependencies among the extracted PRs. The WIR is useful to answer queries such as: "Which variables were derived from other variables?", "What type of libraries and modules were used?", and "What operations were applied to each variable?"

More formally, a WIR is a directed bipartite graph G=(V∪P, E) with vertices V∪P and edges E⊂(V×P)∪(P×V). Each edge has an associated type from the following set: {input_edge, output_edge, caller_edge}.

Figure 3:
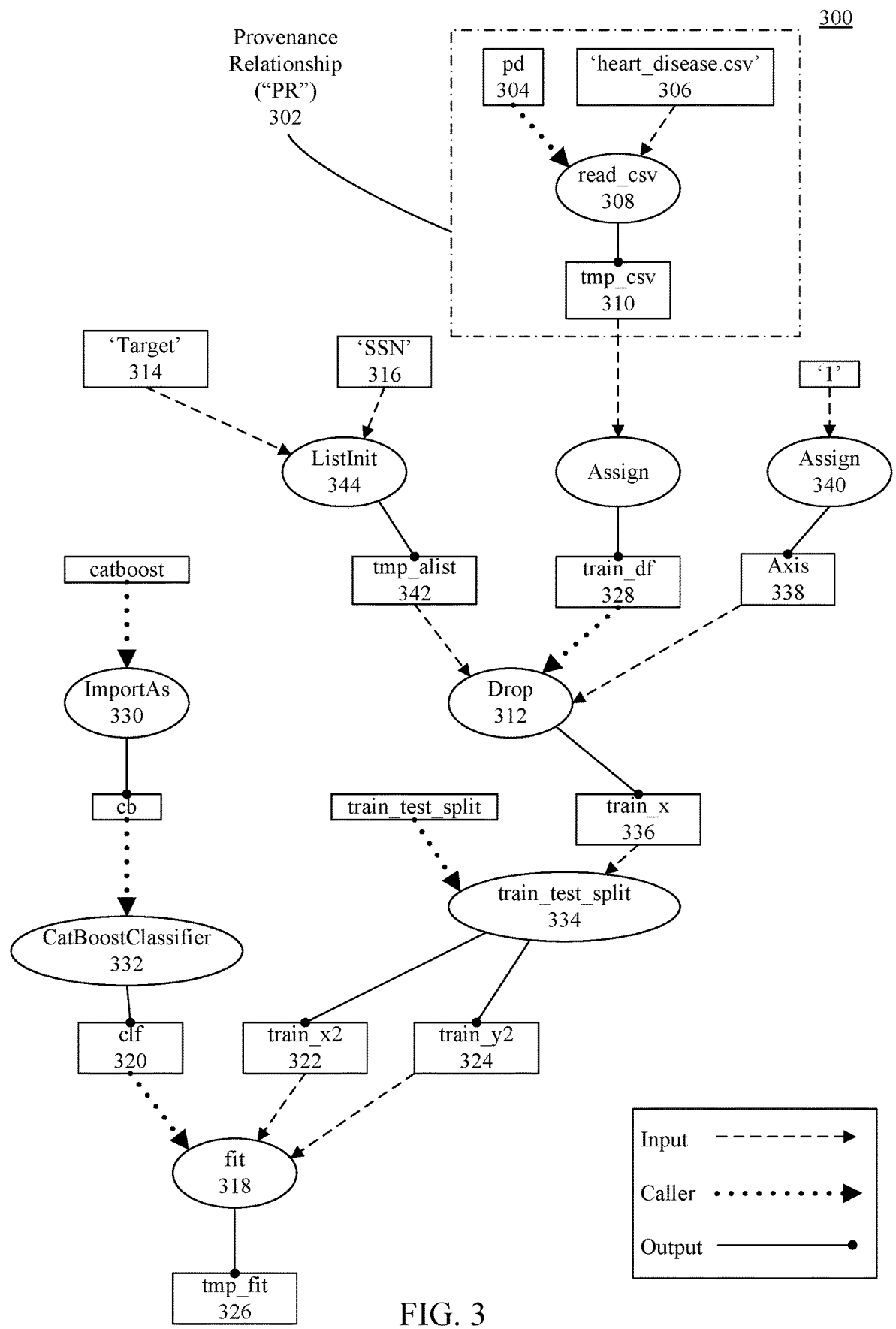
FIG. 3 depicts a partial example of a workflow intermediate representation ("WIR") of an ML model script, according to an embodiment.

Bearing these definitions in mind, consider FIG. 3 which depicts a partial example of a workflow intermediate representation ("WIR") 300 derived from Script 1 (shown above), in an embodiment. The variables and operations are represented by rectangles and ovals, respectively. The caller, input, and output edges are marked as dotted, dashed and solid lines, respectively. Consider the operation fit 318, one can discern the following from WIR 300 of FIG. 3: 1) fit 318 is called by variable cif 320; 2) fit 318 has two ordered input variables train_x2 322 and train_y2 324; and 3) a temporary variable, denoted as tmp_fit 326, was created as its output.

Likewise, WIR 300 of FIG. 3 depicts provenance relationship ("PR") 302 which corresponds to the quadruple (I, C, p, O) where I={(heart_disease. csv)}, c=pd 304, and p=read_csv 308. PR 302 further includes a temporary output variable tmp_csv 310.

Figure 4:
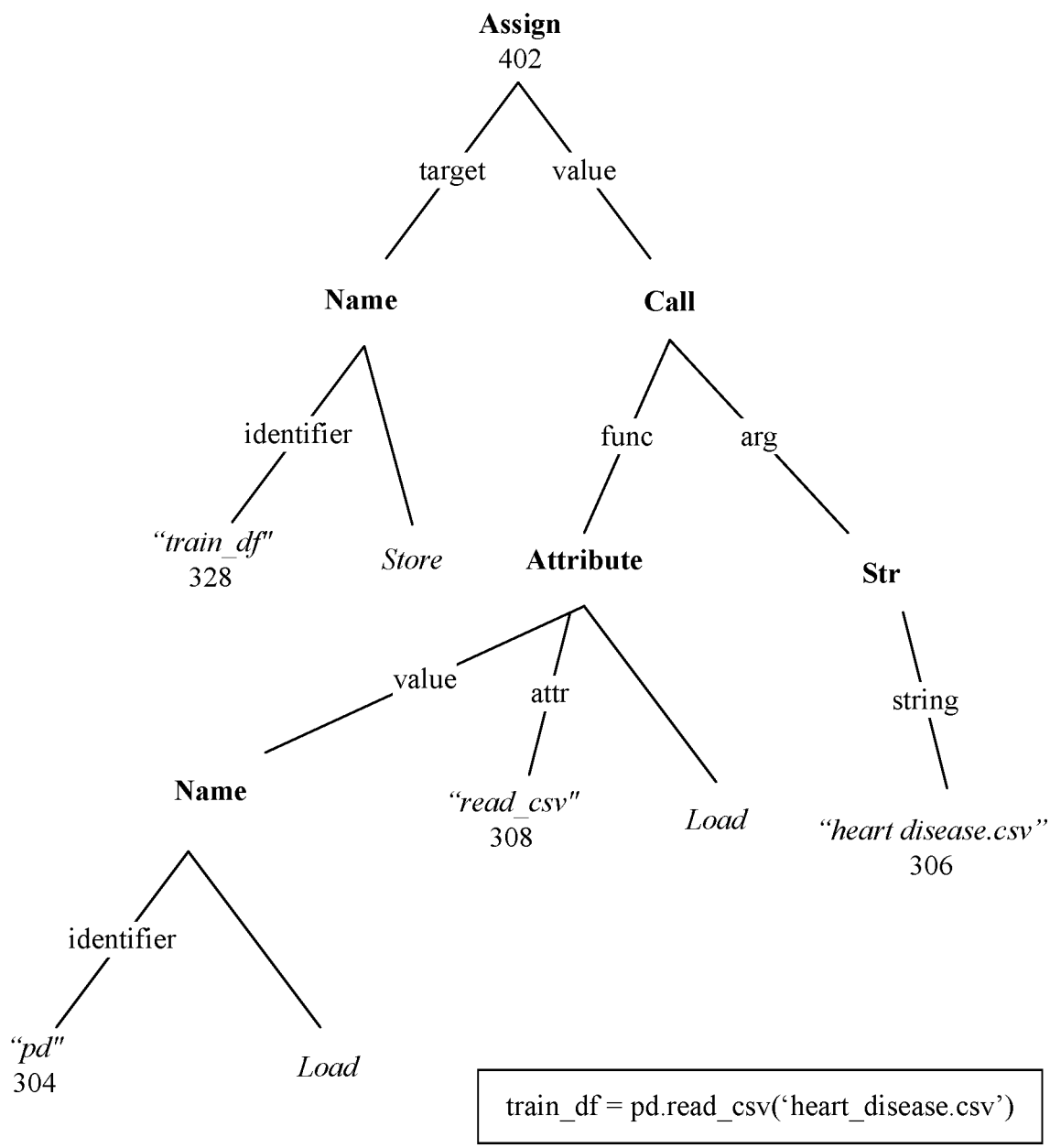
FIG. 4 depicts a partial example abstract syntax tree ("AST") corresponding to the ML model script of FIG. 3, according to an embodiment.

In an embodiment, derivation extractor 202 is configured to generate a complete WIR from Script 1 according to a three-step process. First, derivation extractor 202 parses Script 1 to obtain a corresponding abstract syntax tree ("AST") representation of Script 1. Generally speaking, and as known in the art, an AST is a tree representation of the abstract syntactic structure of source code written in a programming language. For example, FIG. 4 depicts a partial example AST 400 corresponding to a portion of Script 1 (shown above), and which partially corresponds to WIR 300 of FIG. 3. More specifically, FIG. 4 depicts a fraction of an AST 400 generated from line 4 of Script 1 (i.e., generated from train_df=pd.read_csv('heart_disease.csv')). AST 400 is a collection of nodes that are linked together based on the grammar of the Python language. Informally, by traversing AST 400 from left-to-right and top-to-bottom, one can visit the Python statements in the order presented in Script 1.

Note, although embodiments disclosed herein are generally described in terms of the Python programming language, it should be appreciated that support for other programming languages may be easily implemented by extending the capabilities of derivation extractor 202. In particular, an AST is an abstraction of the underlying programming code, and techniques and algorithms further describe herein below operate on the abstraction (i.e., AST) and objects derived therefrom. Accordingly, support for other programming languages may be accomplished by augmenting the capabilities of derivation extractor 202 to enable generation of an AST from source code written in some other language such as, for example, Java.

Returning to the description of derivation extractor 202, after generating an AST from a script, derivation extractor 202 then performs the second and third step of the WIR generation process by a) identifying the relationships between the nodes of the AST to generate PRs, and b) composing the generated PRs into the directed graph G (i.e., the WIR of the input script). In an embodiment, these two steps may be performed together with a reclusive algorithm (owing to the recursive nature of AST node definitions).

An example of such algorithm, denoted as GenWIR, is shown herein immediately below:

---
Algorithm 1: GenWIR
---

```
    # Input: AST root node r
    # Output: WIR G
1:  PRs : = ∅;
2:  for each v in children(r) do
3:      (∅, PRs') := GenPR(v, PRs);
4:      PRs : = PRs ∪ PRs' ;
5:  construct G by connecting PRs
6:  return G;
    Procedure GenPR(v, PRs)
    # Input: AST node v and PRs generated so far
    # Output: a set of WIR variables and updated PRs
1:  c : = ⊥; p:=extract from node(v; 'operation');
2:  if v ∈ {Str, Num, Name, NameConstant} then
3:      return ({v} , PRs) ;
4:  (I, PRs) := GenPR(extract from node(v, 'input'), PRs);
5:  (c, PRs) := GenPR(extract from node(v, 'caller'), PRs);
6:  (O, PRs) := GenPR(extract from node(v, 'output'), PRs);
7:  PRs := PRs ∪ PR(I,c,p,O);
8:  return (O, PRs);
```

The GenWIR algorithm, as performed by embodiments of derivation extractor 202, takes as input the root of the AST tree (i.e., node r) and traverses its children from left-to-right. For each visited AST node, in order to generate PRs, procedure GenPR as shown in GenWIR above is invoked recursively. Each invocation of GenPR in line 3 of GenWIR may create multiple PRs. All the PRs are accumulated (line 4) and a graph G is constructed by connecting the inputs/caller/outputs of PRs.

The procedure GenPR as illustrated in GenWIR above takes as input an AST node v and a set of already generated PRs. It returns a set of WIR variables and the updated PRs. The returned WIR variables may be used as input/caller/output of other PRs. To this end, GenPR initially obtains the operation from the attributes of the AST node at line 1 of GenWIR. If the AST node is a literal or constant, the current PRs are immediately returned at line 3 of GenPR as shown in GenWIR above. Otherwise, to obtain each of input variables I, potential caller c, and potential derived variables O, GenPR recursively calls itself at lines 4-6, respectively. Once all the required variables for a PR are found, a new PR is constructed and added to the set of so far generated PRs at line 7 of GenPR. Lastly, the last generated PR as well as the updated set of PRs is returned by GenPR at line 8.

During this process, the procedure GenPR extracts the input and output set and a potential caller variable for each PR (as defined and discussed herein above). To this end, GenPR inspects the AST node attributes to instantiate these variables by invoking the extract_from_node procedure. The extract_from_node procedure takes as input an AST node and a literal parameter denoting the information requested (i.e., input, output, caller, operation), and consults the abstract grammar of AST nodes to return the requested information for the given node. For example, when processing the Assign node 402 of AST 400 of FIG. 4, the procedure identifies Assign.value as input, Assign as operation, and Assign.targets as output. It also sets the caller as ∅, since the extract_from_node procedure does not return a caller for the AST node having type Assign.

As described above, and with reference to FIG. 2, the general operation of data source identifier 108 continues with derivation extractor 202 providing the generated WIR 204 to ML analyzer 206, which in turn performs the next part of the data source identification operation: semantic annotation of WIR 204. Operation of one embodiment of ML analyzer 206 will now be described in detail.

Although generated WIRs such as WIR 204 capture the dependencies among the variables and operations of a script, WIRs alone do not provide semantic information such as the role of a variable in the script (e.g., ML model, features) or the type of each object (e.g., CSV file, DataFrame). To support provenance queries, semantic information about variables should be associated to the WIRs. Such information, in turn, identifies critical variables such as hyperparameters, models, and metrics for ML applications.

Finding the role of each variable in a WIR is a challenging task for multiple reasons: (1) it may be difficult or impossible to accurately deduce the role/type of input and output of each operation by looking only at the name of the operation as different ML libraries may use the same name for different tasks; (2) even in the same library, an operation may accept different number of inputs or provide different outputs (e.g., by means of operator overloading); and (3) the type of the caller object might also affect the behavior of the operation (e.g., in the sklearn library, invocation of the fit function by a RandomForestClassifier creates a model, but the same function via LabelEncoder does not); (4) the APIs of many libraries are not yet stable and change as these evolve; (5) Some variables are even harder to semantically annotate because of lack of concrete APIs associated with them. For example, identifying when a variable represents features is challenging since typically there is no specific API to load the training dataset. Instead, the common practice is to use generic functions such as read_csv to load training data similarly to other data sources.

For all these reasons, embodiments of ML analyzer 206 work in conjunction with knowledge base 220 as shown in FIG. 2 to perform semantic annotation of WIR 204. ML analyzer 206 relies on knowledge base 220 when executing the annotation algorithm discussed below to answer questions such as, for example, "What is the role of the input/output variables of a particular operation belonging to a given ML library?" In particular, ML analyzer 206 annotates WIR 204 by querying knowledge base 220 to obtain semantic information about the variables and operations of the PRs of WIR 204. Before, describing an embodiment of ML analyzer 206 and a corresponding annotation algorithm, knowledge base 220 will first be further described.

In an embodiment, knowledge base 220 contains fine-grained information about ML libraries stored in the form of relational tables. For each library, knowledge base 220 stores the library name (e.g., sklearn, xgboost), version number, and modules (e.g., ensemble, svm). For each unique API in a library, knowledge base 220 may include the corresponding library, module, caller type, and operation name (e.g., train_test_split from the model_selection module of the sklearn library or read_csv from the Pandas library). For each potential input of an operation, knowledge base 220 stores its role (e.g., features, labels, hyperparameter, and metric) and its data type (e.g., DataFrame, array, CSV file). Similarly, knowledge base 220 contains semantic information about the outputs of the various operations. By way of example, please consider Table 1 as shown herein below, an example of semantic facts that may be stored in knowledge base 220.

TABLE 1

Example of facts in knowledge base 220

| Library | Module | Caller | API Name | Inputs | Outputs |
|---|---|---|---|---|---|
| catboost | NULL | NULL | CatBoostClassifier | eval metrics: hyperparameter | model |
| catboost | NULL | model | fit | features labels eval set: validation sets | trained model |
| sklearn | model selection | NULL | train test split | features labels test size: testing ratio | features validation features |

Table 1 shows three tuples in that may be included in knowledge base 220, in an embodiment. The tuples shown are a small example subset of tuples that may be utilized by the annotation algorithm executed by ML analyzer 206 to identify the variables that correspond to models and features in, for example, Script 1 as described above. For example, the second tuple shows that when the operation fit is called via a model constructed by catboost library, its first and second input are features and labels, respectively. It also accepts validation sets as input. The output of the operation is a trained model.

To facilitate the annotation of WIR variables, an embodiment of knowledge base 220 supports two types of queries. The first query may be denoted as KB(L, L', c, p) takes as input the name of a library, module, caller type, and operation name and returns a set of user-defined annotations that describe the role and type for each input/output of operation p. The second query may be denoted as KB(O, p) and may be configured to obtain the annotations of the input variables of operation p given the annotations of its output variables O.

Returning now to the description of ML analyzer 206, and with continued reference to FIG. 2, an example embodiment of an annotation algorithm employed by ML analyzer 206 will now be discussed. Generally speaking, ML analyzer 206 may be configured to traverse WIR 204 and annotate its variables by appropriately querying knowledge base 220 when needed. After each annotation, new semantic information about a WIR node is obtained that can be used to enrich the information associated with other WIR variables, as is typical in analysis of data flow problems. The propagation of semantic information is achieved through a combination of forward and backward traversals of the WIR as will now be described. Please consider the following annotation algorithm:

---

Algorithm 2: Annotation algorithm

```
    # Input: WIR G 204 and knowledge base 220
    # Output: Annotated WIR G⁺
1:  Find the Import process nodes in G as the seed set S;
2:  for each v_s ∈ S do
3:     Extract library L and module L'
4:     Starting from v_s, DFS forward traverse on PRs:
5:     for each seen PR =⟨I, c, p, O⟩ do
6:        Obtain annotation of v_i ∈ I and v_o ∈ O
             by invoking KB(L, L', c, p)
7:        for each annotated v_i ∈ I do
8:           Starting from v_i, DFS backward traverse on PRs:
9:           For each seen PR =⟨I, c, p, O⟩ do
10:             Obtain annotation of v_i ∈ I
                   by invoking KB(O, p)
11: return G⁺;
```

---

In an embodiment, ML analyzer 206 is configured to perform the annotation algorithm as shown above to annotate the variables of WIR 204 variables by using knowledge base 220. As shown above, the annotation algorithm takes as input WIR 204, (i.e., the directed graph G as extracted from the script by derivation extractor 202) and computes an annotated graph G⁺ (i.e., an "annotated WIR") enriched with corresponding semantic information. Specific details of the above shown annotation algorithm will now be described with continued reference to FIG. 3 and ML analyzer 206.

The annotation algorithm of ML analyzer 206 starts by finding a set of PRs with p=Import as a seed set S for upcoming DFS traversals at line 1. These PRs contain the information about imported libraries and modules in the Python script (e.g., Script 1 as shown above). For each vs, the algorithm extracts the library name L and the potential utilized module L' at line 3. ML analyzer 206 then initiates a depth-first search traversal that starts from vs and traverses the WIR in a forward manner i.e., by going through the outgoing edges as depicted on line 4. For each seen PR, ML analyzer 206 obtains the annotation information for both of its inputs I and outputs O by querying knowledge base 220 as described in the previous section and as shown at lines 5 and 6 of the above shown annotation algorithm.

If a new annotation was found for an input variable $v_i \in I$, ML analyzer 206 initiates a backward DFS traversal. Since the input variable $v_i$ can be the output of another PR, any new information discovered for $v_i$ may be propagated to the other PRs in which $v_i$ is their output. In particular, starting from $v_i$, the algorithm traverses the WIR in a backward manner i.e., by going through the incoming edges as shown on line 8. During the backward traversal, knowledge base 220 queries are performed to obtain information about the inputs of an operation given its already annotated output. In each initiated DFS traversal, each edge is visited only once. Embodiments of ML analyzer 206 terminate execution of the annotation algorithm when no more annotation information may be obtained by initiating more forward/backward traversals.

Operation of ML analyzer 206 and the annotation algorithm described above will now be further described with reference to example WIR 300 as depicted in FIG. 3. Suppose ML analyzer 206 is operating on WIR 300 of FIG. 3. ML analyzer 206 initializes the seed set S of the annotation algorithm with the only Import operation in WIR 300 (i.e., ImportAs 330), and sets L=catboost and L'=⊥. Starting at ImportAs 330, the above described annotation algorithm performed by embodiments of ML analyzer 206 performs a DFS forward traversal and will encounter CatBoostClassifier 332. Upon encountering the p=CatBoostClassifier 332 operation, ML analyzer 206 executes query KB(L, L', c, p) against knowledge base 220 to obtain the annotations of its output. In particular, and with reference to knowledge base 220 Table 1 shown above, the Output of the CatBoostClassifier 332 operation is a model. Accordingly, variable cif 320 may be annotated to indicate the variable is of type model. Since there exists no input edge for CatBoostClassifier 332 node in this WIR, no backward traversal is initiated.

ML analyzer 206 thereafter continues with the DFS traversal and subsequently encounters the fit 318 function. The annotation algorithm of ML analyzer 206 again executes query KB(L, L', c, p) against knowledge base 220 with the same L and L', but with c and p updated to model, and fit, respectively. Per Table 1 shown above, the output of the fit operation is of type trained model, and the output of fit 318 is updated with an annotation indicating that the output is of type trained model. Forward propagation stops at fit 318 since there are no more outgoing edges in the node.

One of ordinary skill will appreciate that continued execution of the above described algorithm on fit 318 will likewise annotate train_x2 322 and train_y2 324 as features and labels, respectively. Accordingly, ML analyzer 206 may initiate a backward DFS traversal starting at each of train_x2 322 and train_y2 324 to propagate this information as much as possible to the previous nodes in the WIR. Thus, for example, following the backward traversal beginning at train_x2 322, when visiting test_train_split 334, train_x 336 will be annotated as type features, which is similarly back-propagated to train_df 326 as the caller of the drop 312 operation. The algorithm continues until we cannot obtain more annotation information, and all possible annotations are completed. As noted above, and with continued reference to FIG. 3, embodiments of ML analyzer 206 thereafter outputs annotated WIR 208 (i.e., directed graph $G^+$) to provenance tracker 210.

With continued reference to FIG. 2, provenance tracker 210 will now be described. As noted above, provenance tracker 210 is responsible for automatically detecting the subset of columns (or rows or cells) in a data source that was used to train a ML model such as the model generated by Script 1 shown above. Generally speaking, provenance tracker 210 operates to identify the columns by examining the operations in annotated WIR 208 that are connected to variables that contain features and labels in their annotation set, and which may act to either select or exclude certain columns in a data source. That is, there are various operations that take features (or labels) as their caller/input, and may apply transformations, drop a set of columns from it, select a subset of rows upon satisfaction of a condition, copy it into another variable, and/or use it for visualization and the like.

Based on this knowledge, knowledge base 220 may be further configured to include information about such operations to assist provenance tracker 210 in executing a provenance tracking algorithm. For example, embodiments of knowledge base 220 are further configured to include a table consisting of two types of operations as follows: 1) operations from various Python libraries that exclude columns (e.g., drop and delete in the Pandas library) or explicitly select a subset of columns (e.g., iloc and ix), and 2) a few native Python operations such as Subscript, ExtSlice, Slice, Index, and Delete. For each entry in this table, a flag column_exclusion=True may be set if the corresponding operation can be used for column exclusion (e.g., drop and delete). Some operations captured in knowledge base 220 can be used to remove both columns and rows depending on the values of one or more input parameters. For example, the function drop in the Pandas library is used to remove rows when the parameter axis 338 is set to 0, and remove columns when the value of the parameter is 1. The parameters of the operations are also captured in annotated WIR 208, and thus their values are easily known and verified. The condition that needs to be checked to verify whether a particular invocation of an operation is used to remove columns is also added to knowledge base 220 along with the operation.

With continued reference to FIG. 2, provenance tracker 210 may issue query 216 to knowledge base 220, by invoking $KB_C(p)$ where p is the name of the operation. Query result 218 is returned by knowledge base 220 to provenance tracker 210, and returns $\emptyset$ if there is no matching entry for p in knowledge base 220. However, if operation p matches to one of the entries in the table, the query returns the following output: (1) condition: the condition associated with the operation as mentioned above (if any); 2) column_exclusion: whether the operation can be used for column exclusion; and 3) traversal_rule: a description on how to start a backward traversal from the node's input edges in order to identify a set/range of indices/column names.

The above described general operation of provenance tracker 210 and its queries of knowledge base 220 may be better understood by way of an example. To that end, and with reference to Script 1 shown herein above, consider FIG. 5 which depicts another example workflow intermediate representation 500 corresponding to Script 1 and in particular, the fraction of the WIR that includes a Subscript 502 operation and which corresponds to line 5 of Script 1. Functionally, the Python code of line 5 of Script 1 reads from data source 'heart_disease. csv' 306 via the iloc method of train_df, where the read selects all rows of data, but only includes the columns from index 3 to the last index in the dataset. With reference to WIR 500 of FIG. 5, one can find determine this set of included columns by traversing backward from Subscript 502 by following its input edge and reaching the constant values input to the Slice operations Slice 504 and Slice 506. Thus, a traversal_rule associated with a Subscript operation indicates that the input edge of this node must be followed in a backward manner to eventually reach the selected columns. Such columns may thereafter be added to a column inclusion set. Note that this is the case for all WIRs that contain this operation.

Similarly, consider the drop 312 operation in WIR 300 of FIG. 3. Drop 312 operation is related to feature selection since its caller (train_df 328) was annotated as features as discussed above, and drop 312 in this case is set to operates at the level of columns since the condition axis=1 is set by Assign 340 and input to Drop 312 at invocation. To find the columns that were dropped, one may again follow the input edge of drop 312 corresponding to tmp_alist 342 backwards through ListInit 344 to reach the constants 'Target' 314 and 'SSN' 316. In this fashion, it may be determined that the columns corresponding to 'Target' and 'SSN' are explicitly excluded from being used as features in the model, and therefore included in a column exclusion set.

The above described general technique of provenance tracking may be formalized as, for example, the provenance tracking algorithm shown immediately herein below:

---

Algorithm 3: Provenance tracking algorithm

Input: Annotated WIR $G^+$ 204 and knowledge base 220
Output: Column inclusion set $C^+$ and exclusion set $C^-$
1:    $C^+ := \emptyset$; $C^- := \emptyset$;
2:    for each PR in PRs do
3:        if PR has a variable annotated as features or labels
          and $KB_C(p) != \emptyset$
4:           GuideEval (PR, $G^+$, KB, $C^+$, $C^-$} ;
5:      return $C^+$, $C^-$;
Operator GuideEval(PR, $G^+$, KB, $C^+$, $C^-$)
   # Inputs: Visited PR
   #        annotated $G^+$ 204
   #        knowledge base 220
   #        Column inclusion set $C^+$
   #        Column exclusion set $C^-$
   # Output: Updated $C^+$, $C^-$.
1:      condition, column_exclusion, traversal_rule = $KB_C(p)$ ;
2:      if exists condition and it is false then return $\emptyset$
3:      if PR has constant inputs cnst then
4:          if column_exclusion = True then
5:             $C^- := C^- \cup$ cnst;
6:          else $C^+ := C^+ \cup$ cnst;
7:          return $C^+$, $C^-$;
8:      Obtain new PR := newPR on $G^+$ based on traversal_rule;
9:      GuideEval (newPR, $G^+$, KB, $C^+$, $C^-$) ;

As outlined above, provenance tracking Algorithm 3 algorithm takes as input the annotated WIR 204 $G^+$ and knowledge base 220, and returns two column sets: the columns that from which features/labels were explicitly derived (inclusion set $C^+$) and (2) the columns that are explicitly excluded from the set of features/labels (exclusion set $C^+$). Provenance tracker 210 may be configured to perform Algorithm 3 whereby it scans each PR in WIR 304 to find the ones with a variable that has been annotated as features (or labels) and an operation which can potentially be used for feature (or label) selection based on the information stored in knowledge base 220 at lines 2-3.

Algorithm 3 relies on a recursive operator denoted as GuideEval( ) operator (as shown above) that starts a guided traversal of WIR 204 based on data from knowledge base 220 corresponding to the operation p of the PR. More specifically, for each of the selected PRs, the GuideEval( ) operator queries knowledge base 220 and obtains the corresponding condition, column_exclusion flag, and traversal_rule (line 1). If a condition exists but it is not matched by the particular operation, it can be deduced that the operation was not used for feature (or label) selection and return without further action as shown at line 2. Otherwise, the operator checks if the current PR contains constant values in its input set as shown on line 3. If so, the discovered constant values/range of column indices into the inclusion/exclusion sets based on the column_exclusion flag. Where the current PR does not directly contain the columns, the GuideEval( ) operator follows the traversal_rule to obtain a new PR ('newPR') on from WIR 204 $G^+$ requiring evaluation at line 8. At line 9, GuideEval( ) calls itself recursively for newPR at line 9.

With continued reference to FIG. 3 and the example discussed herein above describing Subscript and drop operations, suppose the above described provenance algorithm finds the drop 312 operator with a caller that is annotated as features. In that instance, the GuideEval( ) operator will be invoked, and since the corresponding path query is satisfied (i.e., axis=1), we know that the operation is used for feature selection and in particular, feature exclusion (based on the information returned from knowledge base 220). Because drop 312 corresponds to feature exclusion, Algorithm 3 may follow the associated traversal_rule backward from the input edges of drop 312 until it finds the constants 'Target' and 'SSN', and adds those two columns to the exclusion set.

Figure 5:
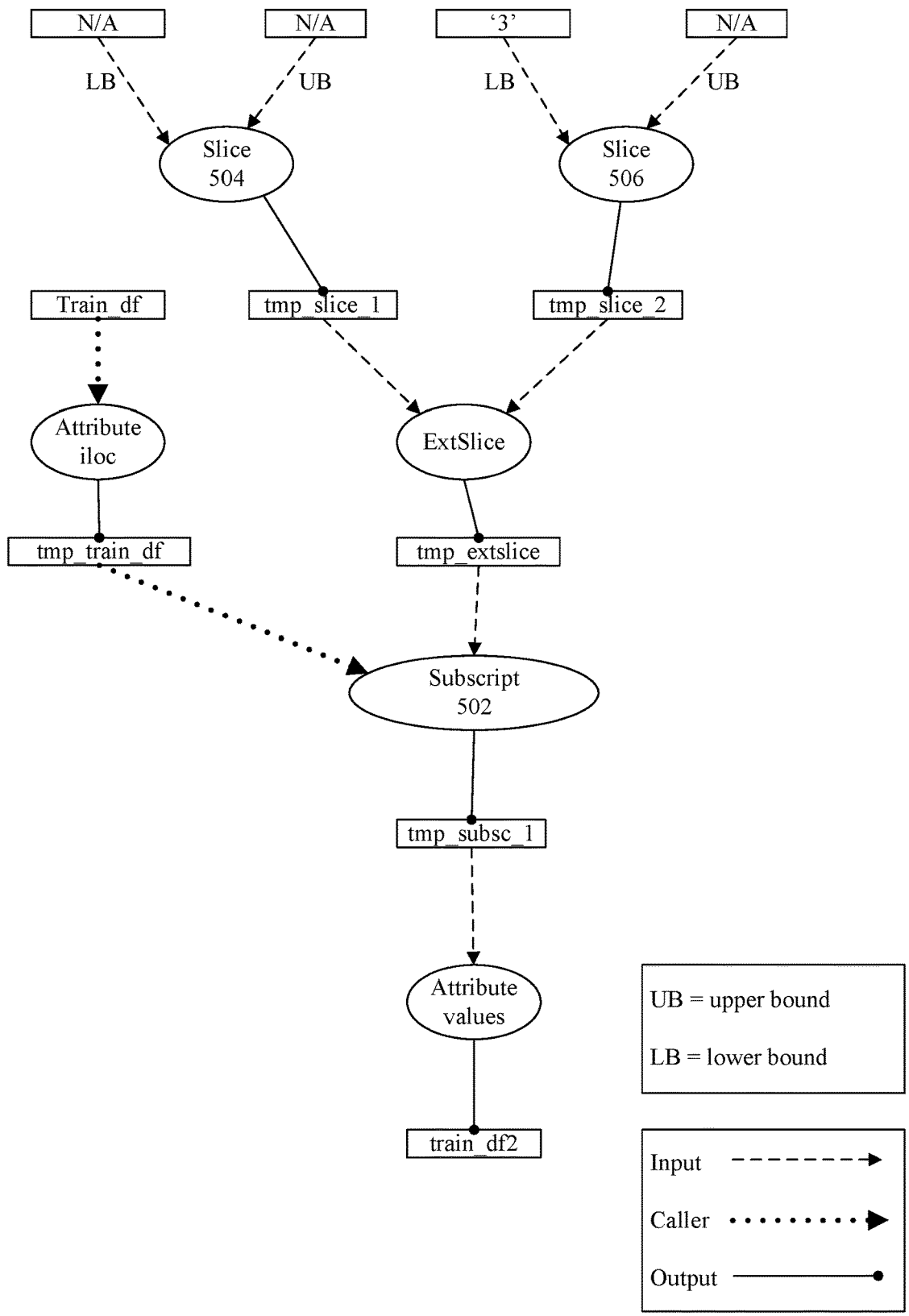
FIG. 5 depicts another example workflow intermediate representation of an ML model script, according to an embodiment.

Likewise, and with reference to WIR 500 of FIG. 5, when provenance tracker 210 finds the Subscript 502, the GuideEval( ) operator is invoked once again. Note that a Subscript operation does not have an associated path query in knowledge base 220. Thus, the GuideEval( ) operator merely obtains the corresponding traversal_rule from knowledge base 220 and initiates a backward traversal starting from the input edge of the Subscript 502. A similar process is performed when the GuideEval( ) operator visits ExtSlice and Slice nodes such as, for example, Slice 504. Using the traversal_rule associated with a Slice operation as reflected in knowledge base 220, provenance tracker 210 may look for a range of columns with lower bound (or upper bound) that can be found by traversing the appropriate input edges of the Slice node under consideration as shown in FIG. 5.

Although techniques and algorithms described herein above regarding provenance tracker 210 are couched in terms columns (i.e., column inclusion and column exclusion sets), one of skill in the art will appreciate that the techniques may be extended to track fine-grained data such as rows and cells. During static analysis as described above, embodiments only have access to the ML model code (e.g., Python script 102) and no access to the targeted data sources, and likewise no access to rows or intermediate datasets. However, it is sometimes possible through analysis of the script and/or annotated WIR to identify places in the code where rows of initial or intermediate steps are filtered out. Such filters provide partitions of input and intermediate datasets, and may be provided as row-level provenance information at static analysis time. Where such row-level provenance information is available, such information may be combined with column provenance information to provide cell-level provenance information.

Moreover, techniques and algorithms described herein may be extended from a static analysis domain to enable dynamic analysis. Although fine-grained provenance capture is acknowledged to be a difficult dynamic analysis problem, techniques are available for providing provenance capture for certain types of individual operators (e.g., group-by aggregation and/or other database operators). Embodiments described herein above enable such techniques through the extensibility of knowledge base 220 wherein the semantics of such operators may be annotated with functions responsible for fine-grained provenance capture. Once such function annotations are included in knowledge base 220, provenance tracker 210 may be augmented to preform module rewrites in the Python script to also execute at run-time the fine-grained provenance functions responsible for provenance capture.

More generally, the above described dynamic provenance tracking techniques may likewise be extended to permit a generalized dynamic code analysis platform. That is, embodiments enable allows introspecting the Python script per what is provided as annotations to operators in knowledge base 220 (as enabled by provenance tracker 210). As such, provenance tracker 210 may operate in two modes: for static analysis as described herein above, or for dynamic analysis where embodiments would return a new Python script including functional modifications (based on annotations as described above). During script execution, provenance information may be dynamically captured and provided. Use of such a framework was already discussed herein above in the context of provenance capture re: rows and cells. With the same framework however, embodiments may be configured to also identify columns that are used as features in the model that could not be identified during static analysis. For instance, if a dataset is loaded using pandas (i.e., Python Data Analysis Library) using the pandas.read_csv function, then the Python script may be augmented with an annotation of pandas.read_csv (i.e., a function) that takes as input the result of pandas.read_csv (i.e., a DataFrame), and provides access to the column information as provided by the DataFrame at runtime.

Further operational aspects of data source identifier 108 of FIG. 1, and derivation extractor 202, ML analyzer 206 and provenance tracker 210 of FIG. 2 will now be discussed in conjunction with FIG. 6 which depicts a flowchart 600 of an example method for tracking machine learning model data provenance, according to an embodiment. Flowchart 600 is described with reference to data source identifier 108 of FIG. 2. However, other structural and operational embodiments will be apparent to persons skilled in the relevant art(s) based on the following discussion regarding flowchart 600 of FIG. 6 and data source identifier 108 of FIG. 2.

Flowchart 600 begins at step 602. At step 602, machine learning (ML) model code is received, the ML model code using at least a first ML application programming interface (API) that when executed, generates and trains an ML model. For example, and with reference to data source identifier 108 of FIGS. 1 and 2, script 102 (e.g., Script 1 as shown herein above) may be provided to data source identifier 108 as shown in FIG. 1 and as described herein above. Also, as described above, Script 102 may comprise ML model code, such as Python code, that instantiates and trains an ML model using one or more ML API such as, for example, scikit-learn, XGBoost, LightGBM, Pandas, CatBoost, StatsModels and/or Graphlab. Flowchart 600 of FIG. 6 continues at step 604.

In step 604, a workflow intermediate representation (WIR) of the ML model code is determined. For example, and with continued reference to and data source identifier 108 of FIGS. 1 and 2, derivation extractor 202 is configured to accept script 102 and determine WIR 204 in the manner described in detail above, in an embodiment. Flowchart 600 of FIG. 6 continues at step 606.

In step 606, the WIR is semantically annotated based at least in part on the first ML API associated with the ML model code to generate an annotated WIR. For example, and with continued reference to data source identifier 108 of FIGS. 1 and 2, ML analyzer 206 as shown in FIG. 2 is configured to accept WIR 204 and semantically annotate same to generate annotated WIR 208 in the manner described in detail above, in embodiments. Flowchart 600 concludes at step 608.

At step 608, based at least on the annotated WIR and the first ML API, data from at least one data source that is relied upon by the ML model code when training the ML model is identified. For example, and with continued reference to data source identifier 108 of FIGS. 1 and 2, provenance tracker 210 is configured to accept annotated WIR 208, and identify at least one data source that is relied upon by the ML model code of script 102 when training the ML model in the general manner described in detail above with respect to provenance tracker 210, in embodiments.

In the foregoing discussion of steps 602-608 of flowchart 600, it should be understood that other operational embodiments will be apparent to persons skilled in the relevant art(s). Note also that the foregoing general description of the operation of data source identifier 108 is provided for illustration only, and embodiments of data source identifier 108 may comprise different hardware and/or software, and may operate in manners different than described above. Indeed, steps of flowchart 600 may be performed in various ways.

Figure 6:
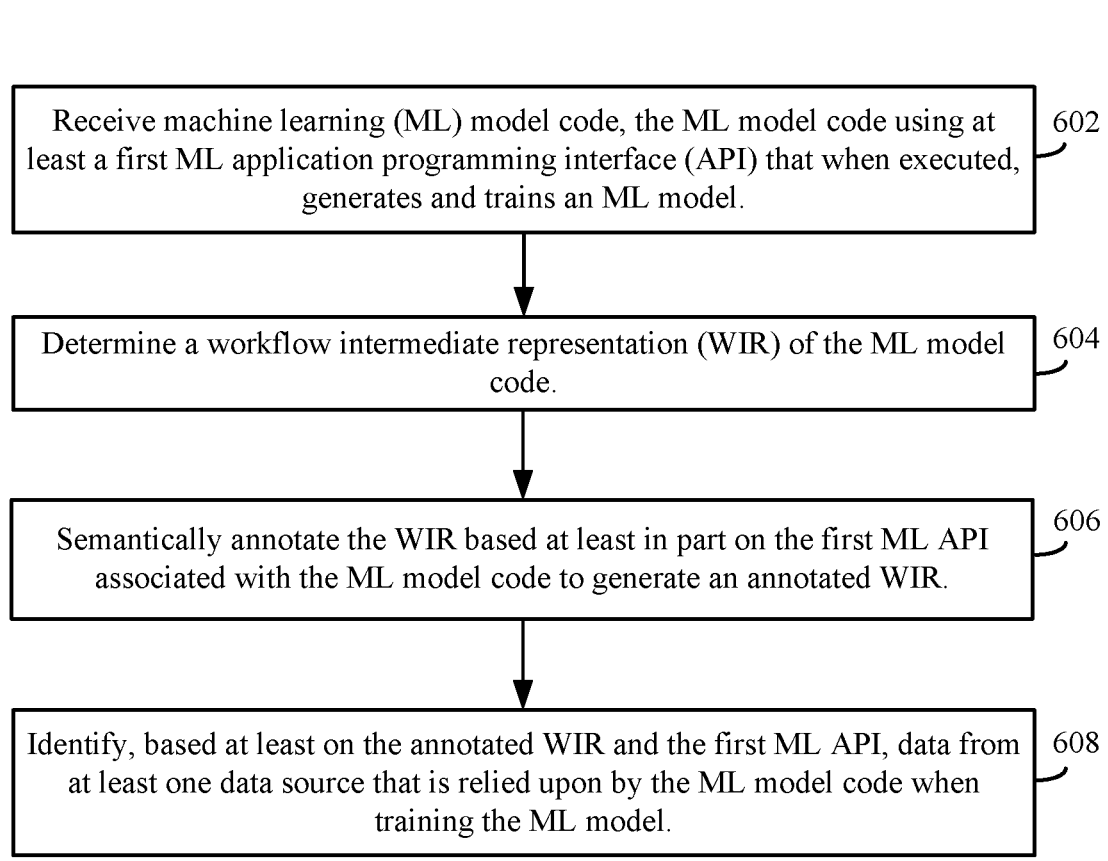
FIG. 6 depicts a flowchart of an example method for tracking machine learning model data provenance, according to an embodiment.
Figure 7:
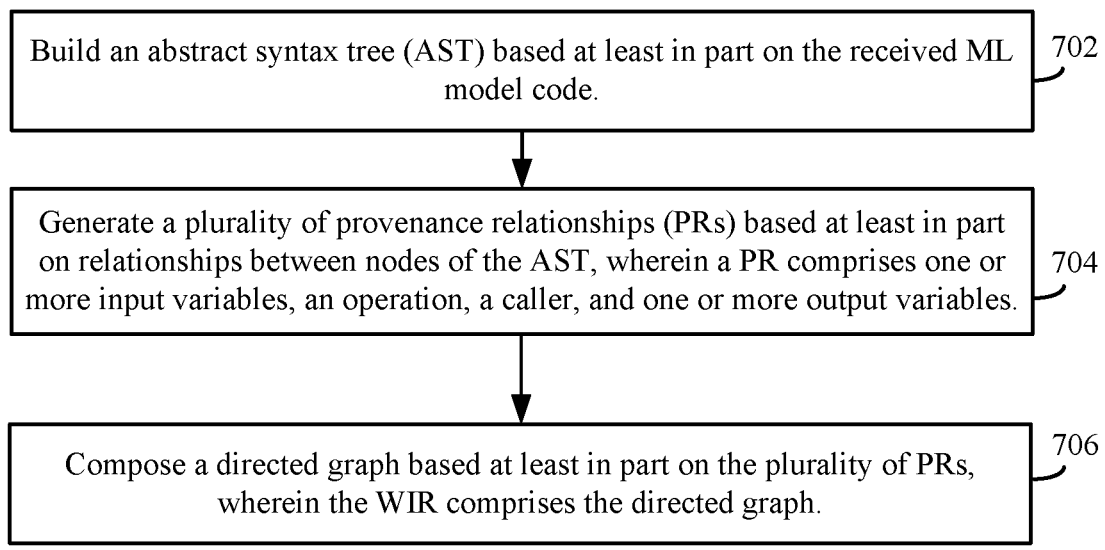
FIG. 7 depicts a flowchart of a refinement to the flowchart of FIG. 6 for determining a WIR of ML model code, according to an embodiment.

For example, FIG. 7 depicts a flowchart 700 of a method for determining a WIR of ML model code, according to an embodiment, and wherein flowchart 700 comprises refinements and/or additions to the method steps of flowchart 600 as depicted in FIG. 6, and described immediately above. Accordingly, flowchart 700 of FIG. 7 will also be described with continued reference to data source identifier 108 of FIGS. 1 and 2. However, other structural and operational embodiments will be apparent to the relevant art(s) based on the following discussion regarding flowchart 700.

In step 702, an abstract syntax tree (AST) is built based at least in part on the received ML model code. For example, and with continued reference to data source identifier 108 of FIGS. 1 and 2, derivation extractor 202 is configured to accept script 102 and build an AST like AST 400 as shown in FIG. 4 based on script 102, and in the manner described in detail herein above. Flowchart 700 continues at step 704.

In step 704, a plurality of provenance relationships (PRs) are generated based at least in part on relationships between nodes of the AST, wherein a PR comprises one or more input variables, an operation, a caller, and one or more output variables. For example, and with continued reference to data source identifier 108 of FIGS. 1 and 2, derivation extractor 202 is configured to generate a plurality of PRs based on the AST built at step 702 as described above, and in the general manner described in detail above. Flowchart 700 concludes with step 706.

At step 706, a directed graph is composed based at least in part on the plurality of PRs, wherein the WIR comprises the directed graph. For example, and with continued reference to data source identifier 108 of FIGS. 1 and 2, derivation extractor 202 is configured to compose a directed graph (e.g., directed graph G, as described above) by connecting PRs with caller, input and output edges as appropriate, and in the general manner described in detail above.

In the foregoing discussion of steps 702 and 704 of flowchart 700, other operational embodiments should be apparent to persons skilled in the relevant art(s). Note also that the foregoing general description of the operation of data source identifier 108 and derivation extractor 202 is provided for illustration only, and embodiments of data source identifier 108 and derivation extractor 202 may comprise different hardware and/or software, and may operate in manners different than described above. Indeed, steps of flowchart 700 may be performed in various ways.

For example, FIG. 8 depicts a flowchart 800 of a method for generating a plurality of provenance relationships ("PRs"), according to an embodiment, and wherein flowchart 800 comprises refinements and/or additions to the method steps of flowchart 700 as depicted in FIG. 7, and described immediately above. Accordingly, flowchart 800 of FIG. 8 will also be described with continued reference to data source identifier 108 of FIGS. 1 and 2, and derivation extractor 202 of FIG. 2. However, other structural and operational embodiments will be apparent to persons skilled in the relevant art(s) based on the following discussion regarding flowchart 800.

In step 802, a plurality of PRs is generated by traversing the AST starting at each root node of the AST and for each node of the AST that is not a literal or constant, determining an operation corresponding to the node, and recursively determining each one or more inputs, a caller and one or more outputs corresponding to the node, wherein the determined operation, one or more inputs, caller and one or more outputs together comprise a generated PR. For example, and with continued reference to data source identifier 108 of FIGS. 1 and 2, derivation extractor 202 is configured to traverse the AST generated at step 704 of flowchart 700 as depicted in FIG. 7 and as described above, by starting at each node of the AST that is not a literal or constant, and determining an operation at that node, and then recursively traversing the AST to determine the inputs, caller and outputs for the node, wherein the operation, inputs, outputs and caller together comprise a PR as described in detail herein above in the context of describing the operation of derivation extractor 202 and the WIR generation algorithm that may be executed thereby.

In the foregoing discussion of step 802 of flowchart 800, other operational embodiments should be apparent to persons skilled in the relevant art(s). Note also that the foregoing general description of the operation of data source identifier 108 and derivation extractor 202 is provided for illustration only, and embodiments of data source identifier 108 and derivation extractor 202 may comprise different hardware and/or software, and may operate in manners different than described above.

Figure 9:
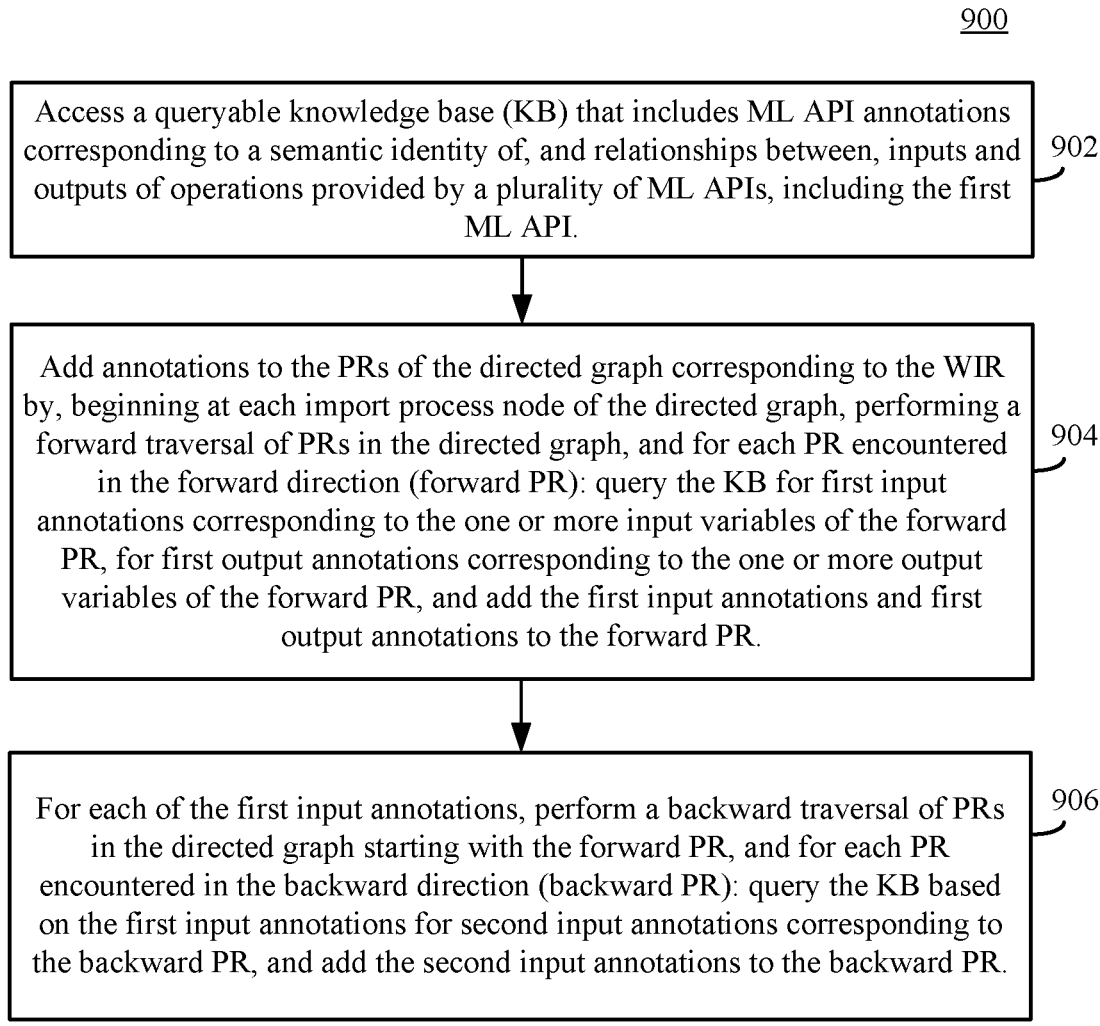
FIG. 9 depicts a flowchart of a refinement to the flowchart of FIG. 7 for semantically annotating a WIR, according to an embodiment.

As noted above, operation of ML analyzer 206 may be accomplished in various ways (e.g., at step 606 of flowchart 600 of FIG. 6 as described above). For example, FIG. 9 depicts a flowchart 900 of a method for semantically annotating a WIR, according to an embodiment, and wherein flowchart 900 comprises refinements and/or additions to the method steps of flowchart 600 as depicted in FIG. 6, and described immediately above. Accordingly, flowchart 900 of FIG. 9 will also be described with continued reference to data source identifier 108 of FIGS. 1 and 2, and ML analyzer 206 of FIG. 2. However, other structural and operational embodiments will be apparent to persons skilled in the relevant art(s) based on the following discussion regarding flowchart 900.

In step 902, a queryable knowledge base (KB) is accessed, where the KB includes ML API annotations corresponding to a semantic identity of, and relationships between, inputs and outputs of operations provided by a plurality of ML APIs, including the first ML API. For example, and with continued reference to data source identifier 108 of FIGS. 1 and 2, ML analyzer 206 is configured to access knowledge base 220 as shown in FIG. 2, where knowledge base 220 includes annotations that may be used to generate annotated WIR 208 from WIR 204, and in the manner described in detail herein above. Flowchart 900 continues at step 904.

In step 904, annotations are added to the PRs of the directed graph corresponding to the WIR by, beginning at each import process node of the directed graph, performing a forward traversal of PRs in the directed graph, and for each PR encountered in the forward direction (forward PR): querying the KB for first input annotations corresponding to the one or more input variables of the forward PR, for first output annotations corresponding to the one or more output variables of the forward PR, and adding the first input annotations and first output annotations to the forward PR. For example, and with continued reference to data source identifier 108 of FIGS. 1 and 2, ML analyzer 206 is configured to traverse the PRs of WIR 204 in a forward direction to determine applicable input and output annotations, and add same to the PR in the manner described in detail above regarding ML analyzer 206. Flowchart 900 concludes with step 906.

At step 906, for each of the first input annotations, a backward traversal of PRs in the directed graph is performed starting with the forward PR, and for each PR encountered in the backward direction (backward PR): the KB is queried based on the first input annotations for second input annotations corresponding to the backward PR, and the second input annotations are added to the backward PR. For example, and with continued reference to data source identifier 108 of FIGS. 1 and 2, ML analyzer 206 is configured to traverse the PRs of WIR 204 in a backward direction to determine additional applicable input annotations based on the input annotations determined in the forward direction, and add same to the PR in the manner described in detail above regarding ML analyzer 206.

In the foregoing discussion of steps 902 and 904 of flowchart 900, other operational embodiments should be apparent to persons skilled in the relevant art(s). Note also that the foregoing general description of the operation of data source identifier 108 and ML analyzer 206 is provided for illustration only, and embodiments of data source identifier 108 and ML analyzer 206 may comprise different hardware and/or software, and may operate in manners different than described above.

As noted above, operation of provenance tracker 210 may be accomplished in various ways (e.g., at step 608 of flowchart 600 of FIG. 6 as described above). For example, FIG. 10 depicts a flowchart 1000 of a method for semantically annotating a WIR, according to an embodiment, and wherein flowchart 1000 comprises refinements and/or additions to the method steps of flowchart 600 as depicted in FIG. 6, and described immediately above. Accordingly, flowchart 1000 of FIG. 10 will also be described with continued reference to data source identifier 108 of FIGS. 1 and 2, and provenance tracker 210 of FIG. 2. However, other structural and operational embodiments will be apparent to persons skilled in the relevant art(s) based on the following discussion regarding flowchart 1000.

In step 1002, for each PR in the directed graph, feature variables are determined comprising variables of the PR that are annotated as features and that correspond to a data selection or exclusion operation, and beginning with the PR of each determined feature variable, recursively traverse the directed graph backwards to identify the data from the at least one data source that corresponds to the feature variable. For example, and with continued reference to data source identifier 108 of FIGS. 1 and 2, provenance tracker 210 is configured to perform a provenance tracking algorithm such as that described in detail above, wherein each PR, determine whether the operation corresponding to the PR is connected to variables that include feature/label annotations, and where the operation may select or exclude data, traverse backward through the directed graph to identify to included or excluded data, and as described in great detail herein above regarding provenance tracker 210.

Figure 11:
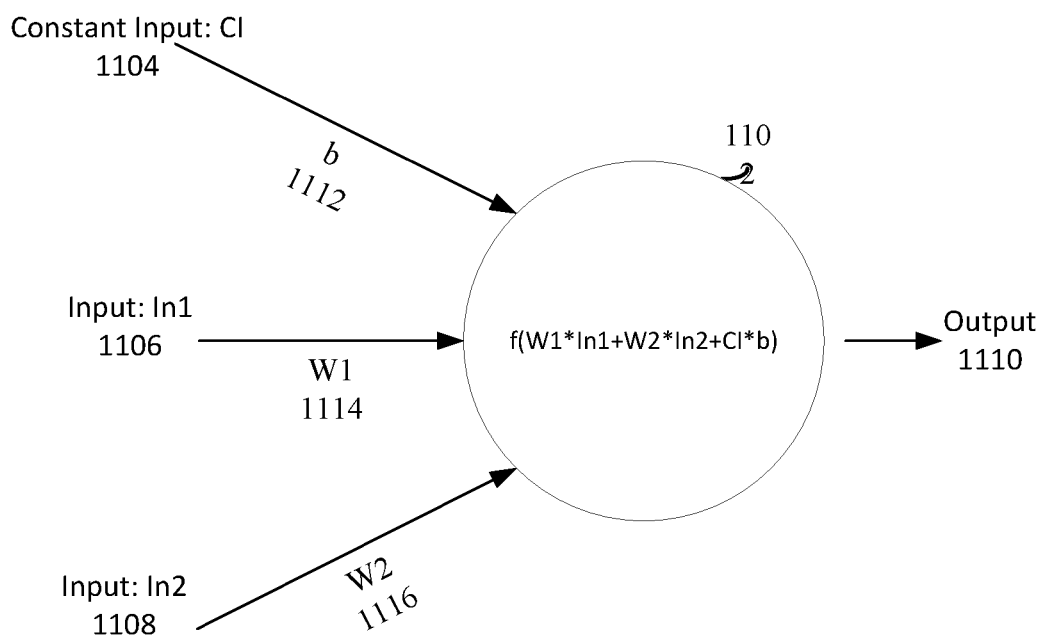
FIG. 11 depicts an example artificial neuron suitable for use in a deep neural network ("DNN"), according to an embodiment.

In embodiments, a machine learning model, such as may be instantiated and trained by script 102 (e.g., Script 1), may comprise, for example, a deep neural network ("DNN"). A DNN is a type of artificial neural network that conceptually is comprised of artificial neurons. For example, FIG. 11 depicts an example artificial neuron 1100 suitable for use in a DNN, according to an embodiment. Neuron 1100 includes an activation function 1102, a constant input CI 1104, an input In1 1106, an input In2 1108 and output 1110. Neuron 1100 of FIG. 11 is merely exemplary, and other structural or operational embodiments will be apparent to persons skilled in the relevant art(s) based on the following discussion regarding neuron 1100 of FIG. 11.

Neuron 1100 operates by performing activation function 1102 on weighted versions of inputs CI 1104, In1 1106 and In2 1108 to produce output 1110. Inputs to activation function 1102 are weighted according to weights b 1112, W1 1114 and W2 1116. Inputs In1 1106 and In2 1108 may comprise, for example, normalized or otherwise feature processed data corresponding to sensor data 106. Activation function 1102 is configured to accept a single number (i.e., in this example, the linear combination of weighted inputs) based on all inputs, and perform a fixed operation. As known in the art, such operations may comprise, for example, sigmoid, tanh or rectified linear unit operations. Input CI 1104 comprises a constant value (commonly referred to as a 'bias') which may typically be set to the value 1, and allows the activation function 1102 to include a configurable zero crossing point as known in the art.

Figure 12:
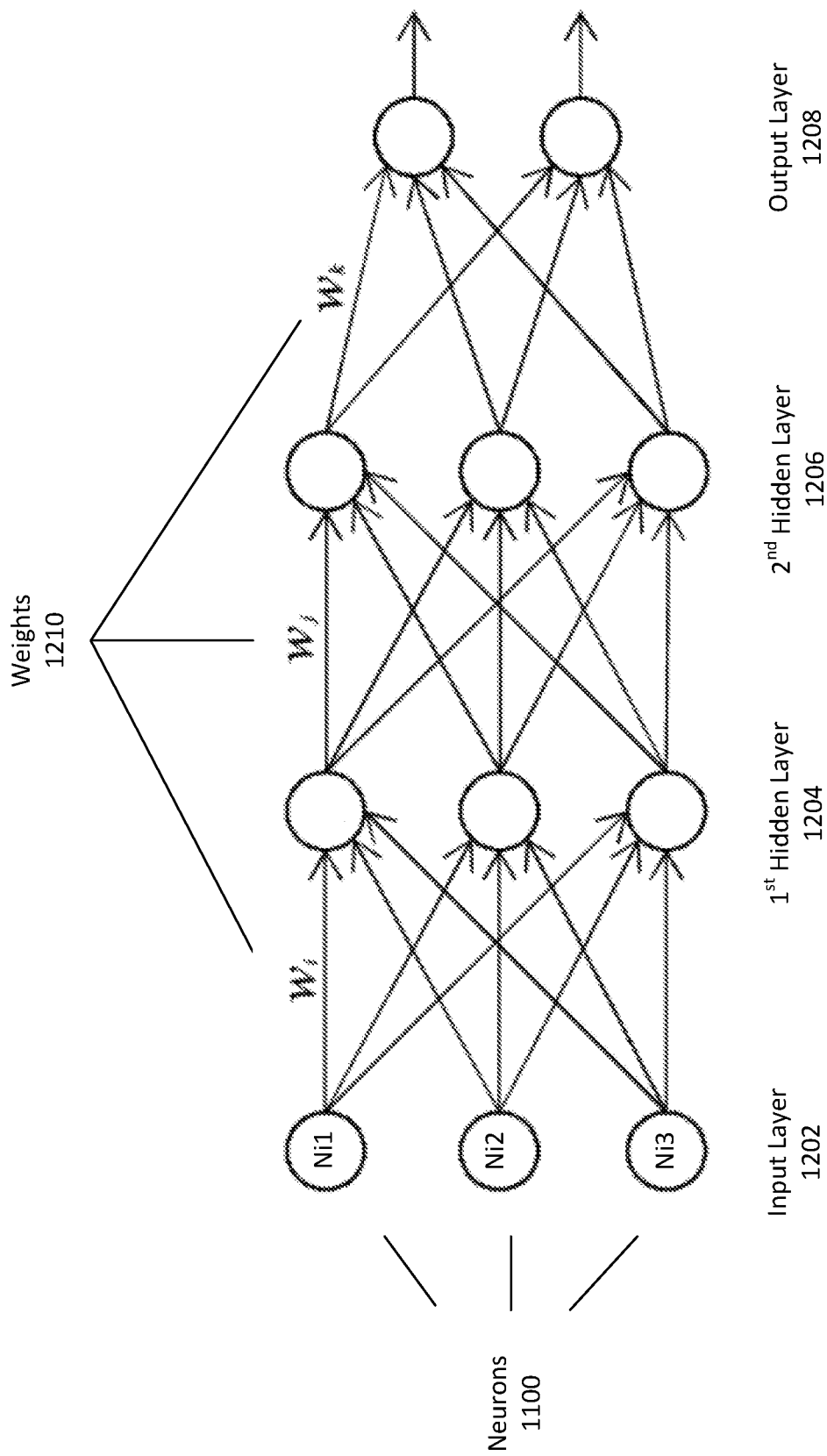
FIG. 12 depicts an example DNN composed of artificial neurons, according to an embodiment.

A single neuron generally will accomplish very little, and a useful machine learning model will require the combined computational effort of a large number of neurons working in concert. For example, FIG. 12 depicts an example deep neural network ("DNN") 1200 composed of a plurality of neurons 1100, according to an embodiment. DNN 1200 includes a plurality of neurons 1100 assembled in layers and connected in a cascading fashion. Such layers include an input layer 1200, a $1^{st}$ hidden layer 1204, a $2^{nd}$ hidden layer 1206 and an output layer 1208. DNN 1200 depicts outputs of each layer of neurons being weighted according to weights 1210, and thereafter serving as inputs solely to neurons in the next layer. It should be understood, however, that other interconnection strategies are possible in other embodiments, and as is known in the art.

The neurons 1100 of input layer 1202 (labeled Ni1, Ni2 and Ni3) each may be configured to accept normalized or otherwise feature engineered or processed data corresponding to sensor data 106 as described above in relation to neuron 1100 of FIG. 11. The output of each neuron 1100 of input layer 1202 is weighted according to the weight of weights 1210 that corresponds to a particular output edge, and is thereafter applied as input at each neuron 1100 of $1^{st}$ hidden layer 1204. It should be noted that each edge depicted in DNN 1200 corresponds to an independent weight, and labeling of such weights for each edge is omitted for the sake of clarity. In the same fashion, the output of each neuron 1100 of $1^{st}$ hidden layer 1204 is weighted according to its corresponding edge weight, and provided as input to a neuron 1100 in $2^{nd}$ hidden layer 1206. Finally, the output of each neuron 1100 of $2^{nd}$ hidden layer 1206 is weighted and provided to the inputs of the neurons of output layer 1208. The output or outputs of the neurons 1100 of output layer 1208 comprises the output of the model. Note, although output layer 1208 includes two neurons 1100, embodiments may instead include just a single output neuron 1100, and therefore but a single discrete output. Note also, that DNN 1200 of FIG. 12 depicts a simplified topology, and a producing useful inferences from a DNN like DNN 1200 typically requires far more layers, and far more neurons per layer. Thus, DNN 1200 should be regarded as a simplified example only.

Construction of the above described DNN 1200 comprises only the start of generating a useful machine learning model. The accuracy of the inferences generated by such a DNN require selection of a suitable activation function, and thereafter each and every one of the weights of the entire model must be adjusted to provide accurate output. The process of adjusting such weights is called "training." Training a DNN, or other type of neural network, requires a collection of training data of known characteristics. For example, where a DNN is intended to predict the probability that an input image of a piece of fruit is an apple or a pear, the training data would comprise many different images of fruit, and typically including not only apples and pears, but also plums, oranges and other types of fruit. Training requires that the image data corresponding to each image is pre-processed according to normalization and/or feature extraction techniques as known in the art to produce input features for the DNN, and such features are thereafter input to the network. In the example above, such features would be input to the neurons of input layer 1202.

Thereafter, each neuron 1100 of DNN 1200 performs their respective activation function operation, the output of each neuron 1100 is weighted and fed forward to the next layer and so forth until outputs are generated by output layer 1208. The output(s) of the DNN may thereafter be compared to the known or expected value of the output. The output of the DNN may then be compared to the expected value and the difference fed backward through the network to revise the weights contained therein according to a backward propagation algorithm as known in the art. With the model including revised weights, the same image features may again be input to the model (e.g., neurons 1100 of input layer 1202 of DNN 1200 described above), and new output generated. Training comprises iterating the model over the body of training data and updating the weights at each iteration. Once the model output achieves sufficient accuracy (or outputs have otherwise converged and weight changes are having little effect), the model is said to be trained. A trained model may thereafter be used to evaluate arbitrary input data, the nature of which is not known in advance, nor has the model previously considered (e.g., a new picture of a piece of fruit), and output the desired inference (e.g., the probability that the image is that of an apple).

III. Example Computer System Implementation

Each of derivation extractor 202, ML analyzer 206, and/or provenance tracker 210, and flowcharts 600, 700, 800, 900 and/or 1000 may be implemented in hardware, or hardware combined with software and/or firmware. For example, derivation extractor 202, ML analyzer 206, and/or provenance tracker 210, and flowcharts 600, 700, 800, 900 and/or 1000 may be implemented as computer program code/instructions configured to be executed in one or more processors and stored in a computer readable storage medium. Alternatively, derivation extractor 202, ML analyzer 206, and/or provenance tracker 210, and flowcharts 600, 700, 800, 900 and/or 1000 may be implemented as hardware logic/electrical circuitry.

For instance, in an embodiment, one or more, in any combination, of derivation extractor 202, ML analyzer 206, and/or provenance tracker 210, and flowcharts 600, 700, 800, 900 and/or 1000 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 13:
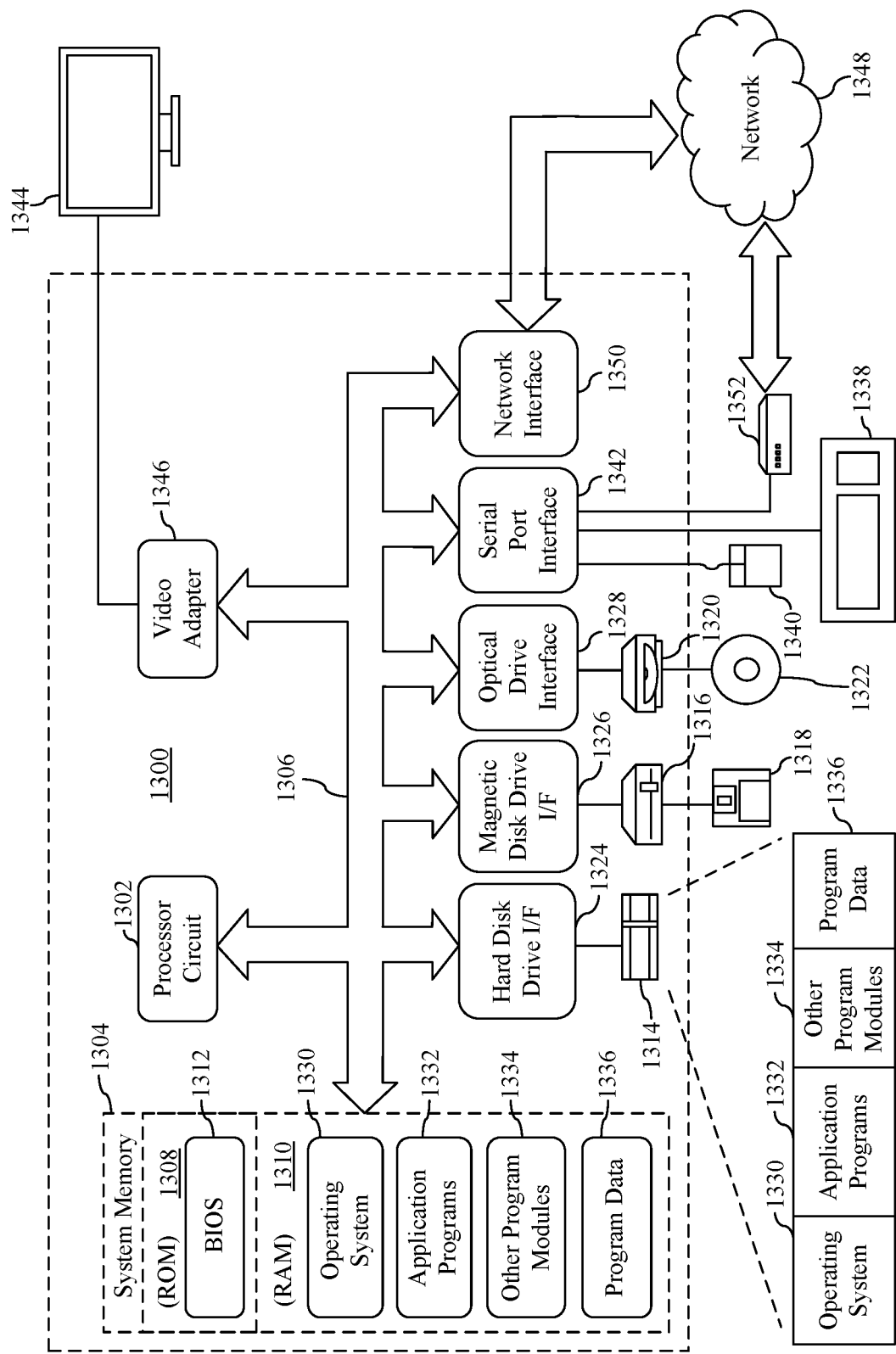
FIG. 13 is a block diagram of an example computer system in which embodiments may be implemented.

FIG. 13 depicts an exemplary implementation of a computing device 1300 in which embodiments may be implemented. For example, user device 138 and server(s) 140 may be implemented in one or more computing devices similar to computing device 1300 in stationary or mobile computer embodiments, including one or more features of computing device 1300 and/or alternative features. The description of computing device 1300 provided herein is provided for purposes of illustration, and is not intended to be limiting. Embodiments may be implemented in further types of computer systems, as would be known to persons skilled in the relevant art(s).

As shown in FIG. 13, computing device 1300 includes one or more processors, referred to as processor circuit 1302, a system memory 1304, and a bus 1306 that couples various system components including system memory 1304 to processor circuit 1302. Processor circuit 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1302 may execute program code stored in a computer readable medium, such as program code of operating system 1330, application programs 1332, other programs 1334, etc. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random access memory (RAM) 1310. A basic input/output system 1312 (BIOS) is stored in ROM 1308.

Computing device 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1330, one or more application programs 1332, other programs 1334, and program data 1336. Application programs 1332 or other programs 1334 may include, for example, computer program logic (e.g., computer program code or instructions) for implementing derivation extractor 202, ML analyzer 206, and/or provenance tracker 210, and flowcharts 300 and/or 400 (including any suitable step of flowcharts 600, 700, 800, 900 and/or 1000), and/or further embodiments described herein.

A user may enter commands and information into the computing device 1300 through input devices such as keyboard 1338 and pointing device 1340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1302 through a serial port interface 1342 that is coupled to bus 1306, but may be connected by other interfaces, such as a parallel port, game port, or a universal serial bus (USB).

A display screen 1344 is also connected to bus 1306 via an interface, such as a video adapter 1346. Display screen 1344 may be external to, or incorporated in computing device 1300. Display screen 1344 may display information, as well as being a user interface for receiving user commands and/or other information (e.g., by touch, finger gestures, virtual keyboard, etc.). In addition to display screen 1344, computing device 1300 may include other peripheral output devices (not shown) such as speakers and printers.

Computing device 1300 is connected to a network 1348 (e.g., the Internet) through an adaptor or network interface 1350, a modem 1352, or other means for establishing communications over the network. Modem 1352, which may be internal or external, may be connected to bus 1306 via serial port interface 1342, as shown in FIG. 13, or may be connected to bus 1306 using another interface type, including a parallel interface.

As used herein, the terms "computer program medium," "computer-readable medium," and "computer-readable storage medium" are used to refer to physical hardware media such as the hard disk associated with hard disk drive 1314, removable magnetic disk 1318, removable optical disk 1322, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1332 and other programs 1334) may be stored on the hard disk, magnetic disk, optical disk, ROM, RAM, or other hardware storage medium. Such computer programs may also be received via network interface 1350, serial port interface 1342, or any other interface type. Such computer programs, when executed or loaded by an application, enable computing device 1300 to implement features of embodiments described herein. Accordingly, such computer programs represent controllers of the computing device 1300.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A method for tracking machine learning data provenance is provided herein. The method comprising: receiving machine learning (ML) model code, the ML model code using at least a first ML application programming interface (API) that when executed, generates and trains an ML model; determining a workflow intermediate representation (WIR) of the ML model code; semantically annotating the WIR based at least in part on the first ML API associated with the ML model code to generate an annotated WIR; and identifying, based at least on the annotated WIR and the first ML API, data from at least one data source that is relied upon by the ML model code when training the ML model.

In an embodiment of the foregoing method, the determining the WIR of the ML model code comprises: building an abstract syntax tree (AST) based at least in part on the received ML model code; generating a plurality of provenance relationships (PRs) based at least in part on relationships between nodes of the AST, wherein a PR comprises one or more input variables, an operation, a caller, and one or more output variables; and composing a directed graph based at least in part on the plurality of PRs, wherein the WIR comprises the directed graph.

In another embodiment of the foregoing method, the generating the plurality of PRs based at least in part on the relationships between the nodes of the AST comprises: traversing the AST starting at each root node of the AST and for each node of the AST that is not a literal or constant, determining an operation corresponding to the node, and recursively determining each one or more inputs, a caller and one or more outputs corresponding to the node, wherein the determined operation, one or more inputs, caller and one or more outputs together comprise a generated PR.

In one embodiment of the foregoing method, the semantically annotating the WIR based at least in part on the first ML API associated with the ML model code to generate the annotated WIR comprises: accessing a queryable knowledge base (KB) that includes ML API annotations corresponding to a semantic identity of, and relationships between, inputs and outputs of operations provided by a plurality of ML APIs, including the first ML API; and adding annotations to the PRs of the directed graph corresponding to the WIR by, beginning at each import process node of the directed graph, performing a forward traversal of PRs in the directed graph, and for each PR encountered in the forward direction (forward PR): querying the KB for first input annotations corresponding to the one or more input variables of the forward PR, for first output annotations corresponding to the one or more output variables of the forward PR, and adding the first input annotations and first output annotations to the forward PR; and for each of the first input annotations, performing a backward traversal of PRs in the directed graph starting with the forward PR, and for each PR encountered in the backward direction (backward PR): querying the KB based on the first input annotations for second input annotations corresponding to the backward PR, and adding the second input annotations to the backward PR.

In an embodiment of the foregoing method, the identifying, based at least on the annotated WIR and the first ML API, data from at least one data source that is relied upon by the ML model code when training the ML model comprises: for each PR in the directed graph, determining feature variables comprising variables of the PR that are annotated as features and that correspond to a data selection or exclusion operation, and beginning with the PR of each determined feature variable, recursively traverse the directed graph backwards to identify the data from the at least one data source that corresponds to the feature variable.

In another embodiment of the foregoing method, the determining the feature variables further comprises determining variables of the PR that are annotated as labels.

In one embodiment of the foregoing method, the data from the at least one data source comprises data corresponding to at least one of: a column, a row or a cell of the at least one data source.

A machine learning data provenance tracking system is provided herein, the system comprising: a derivation extractor component executing on at least one of one or more computers, the derivation extractor component being configured to receive machine learning (ML) model code, the ML model code using at least a first ML application programming interface (API) that when executed, generates and trains an ML model, the derivation extractor component further configured to determine a workflow intermediate representation (WIR) of the ML model code; a queryable knowledge base (KB) stored in one or more memory devices, the queryable KB including: a plurality of ML API annotations corresponding to the semantic identity of, and relationships between, inputs and outputs of operations provided by a plurality of ML APIs, including the first ML API; and a table of operations corresponding to ML model code operations that may perform data selection or exclusion operations; a ML model code analyzer component executing on at least one of the one or more computers, the ML model code analyzer being configured to semantically annotate the WIR based at least in part on the first ML API associated with the ML model code to generate an annotated WIR; and a provenance tracker component executing on at least one of the one or more computers, the provenance tracker component being configured to identify, based at least on the annotated WIR and KB query results, data from at least one data source that is relied upon by the ML model code when training the ML model.

In another embodiment of the foregoing system, the derivation extractor component further configured to determine the WIR of the ML model code by: building an abstract syntax tree (AST) based at least in part on the received ML model code; generating a plurality of provenance relationships (PRs) based at least in part on relationships between nodes of the AST, wherein a PR comprises one or more input variables, an operation, a caller, and one or more output variables; and composing a directed graph based at least in part on the plurality of PRs, wherein the WIR comprises the directed graph.

In an embodiment of the foregoing system, the generating the plurality of PRs based at least in part on the relationships between the nodes of the AST comprises: traversing the AST starting at each root node of the AST and for each node of the AST that is not a literal or constant, determining an operation corresponding to the node, and recursively determining each one or more inputs, a caller and one or more outputs corresponding to the node, wherein the determined operation, one or more inputs, caller and one or more outputs together comprise a generated PR.

In one embodiment of the foregoing system, the ML model code analyzer component is further configured to generate the annotated WIR by: accessing the queryable knowledge base (KB); and adding annotations to the PRs of the directed graph corresponding to the WIR by, beginning at each import process node of the directed graph, performing a forward traversal of PRs in the directed graph, and for each PR encountered in the forward direction (forward PR): querying the KB for first input annotations corresponding to the one or more input variables of the forward PR, for first output annotations corresponding to the one or more output variables of the forward PR, and adding the first input annotations and first output annotations to the forward PR; and for each of the first input annotations, performing a backward traversal of PRs in the directed graph starting with the forward PR, and for each PR encountered in the backward direction (backward PR): querying the KB based on the first input annotations for second input annotations corresponding to the backward PR, and adding the second input annotations to the backward PR.

In another embodiment of the foregoing system, the provenance tracker component is further configured to identify data from at least one data source relied upon by the ML model code when training the ML model by, for each PR in the directed graph, determining feature variables comprising variables of the PR that are annotated as features and that correspond to a data selection or exclusion operation, and beginning with the PR of each determined feature variable, recursively traverse the directed graph backwards to identify the data from the at least one data source that corresponds to the feature variable.

In an embodiment of the foregoing system, the data from the at least one data source comprises data corresponding to at least one of: a column, a row or a cell of the at least one data source.

A computer-readable storage medium is provided herein, the computer-readable storage medium having program instructions recorded thereon that, when executed by at least one processor, perform a method, the method comprising:

receiving machine learning (ML) model code, the ML model code using at least a first ML application programming interface (API) that when executed, generates and trains an ML model; determining a workflow intermediate representation (WIR) of the ML model code; semantically annotating the WIR based at least in part on the first ML API associated with the ML model code to generate an annotated WIR; and identifying, based at least on the annotated WIR and the first ML API, data from at least one data source that is relied upon by the ML model code when training the ML model.

In another embodiment of the foregoing computer-readable storage medium, the determining the WIR of the ML model code comprises: building an abstract syntax tree (AST) based at least in part on the received ML model code; generating a plurality of provenance relationships (PRs) based at least in part on relationships between nodes of the AST, wherein a PR comprises one or more input variables, an operation, a caller, and one or more output variables; and composing a directed graph based at least in part on the plurality of PRs, wherein the WIR comprises the directed graph.

In one embodiment of the foregoing computer-readable storage medium, the generating the plurality of PRs based at least in part on the relationships between the nodes of the AST comprises: traversing the AST starting at each root node of the AST and for each node of the AST that is not a literal or constant, determining an operation corresponding to the node, and recursively determining each one or more inputs, a caller and one or more outputs corresponding to the node, wherein the determined operation, one or more inputs, caller and one or more outputs together comprise a generated PR.

In an embodiment of the foregoing computer-readable storage medium, the semantically annotating the WIR based at least in part on the first ML API associated with the ML model code to generate the annotated WIR comprises: accessing a queryable knowledge base (KB) that includes ML API annotations corresponding to a semantic identity of, and relationships between, inputs and outputs of operations provided by a plurality of ML APIs, including the first ML API; and adding annotations to the PRs of the directed graph corresponding to the WIR by, beginning at each import process node of the directed graph, performing a forward traversal of PRs in the directed graph, and for each PR encountered in the forward direction (forward PR): querying the KB for first input annotations corresponding to the one or more input variables of the forward PR, for first output annotations corresponding to the one or more output variables of the forward PR, and adding the first input annotations and first output annotations to the forward PR; and for each of the first input annotations, performing a backward traversal of PRs in the directed graph starting with the forward PR, and for each PR encountered in the backward direction (backward PR): querying the KB based on the first input annotations for second input annotations corresponding to the backward PR, and adding the second input annotations to the backward PR.

In another embodiment of the foregoing computer-readable storage medium, the identifying, based at least on the annotated WIR and the first ML API, data from at least one data source that is relied upon by the ML model code when training the ML model comprises: for each PR in the directed graph, determining feature variables comprising variables of the PR that are annotated as features and that correspond to a data selection or exclusion operation, and beginning with the PR of each determined feature variable, recursively traverse the directed graph backwards to identify the data from the at least one data source that corresponds to the feature variable.

In one embodiment of the foregoing computer-readable storage medium, the determining the feature variables further comprises determining variables of the PR that are annotated as labels.

In an embodiment of the foregoing computer-readable storage medium, the data from the at least one data source comprises data corresponding to at least one of: a column, a row or a cell of the at least one data source.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A method for tracking machine learning data provenance, comprising:
    receiving machine learning (ML) model code, the ML model code using at least a first ML application programming interface (API) that when executed, generates and trains an ML model;
    determining a workflow intermediate representation (WIR) of the ML model code;
    semantically annotating the WIR based at least in part on the first ML API associated with the ML model code to generate an annotated WIR by querying a queryable knowledge base (KB), the queryable KB including:
        a plurality of ML API annotations corresponding to a semantic identity of, and relationships between, inputs and outputs of operations provided by a plurality of ML APIs, including the first ML API, and
        a table of operations corresponding to ML model code operations that perform data selection or exclusion operations; and
    identifying, based at least on the annotated WIR and the first ML API, data from at least one data source that is relied upon by the ML model code when training the ML model.

2. The method of claim 1 wherein the determining the WIR of the ML model code comprises:
    building an abstract syntax tree (AST) based at least in part on the received ML model code;
    generating a plurality of provenance relationships (PRs) based at least in part on relationships between nodes of the AST, wherein a PR comprises one or more input variables, an operation, a caller, and one or more output variables; and
    composing a directed graph based at least in part on the plurality of PRs, wherein the WIR comprises the directed graph.

3. The method of claim 2 wherein the generating the plurality of PRs based at least in part on the relationships between the nodes of the AST comprises:
    traversing the AST starting at each root node of the AST and for each node of the AST that is not a literal or constant, determining an operation corresponding to the node, and recursively determining each one or more inputs, a caller and one or more outputs corresponding to the node, wherein the determined operation, one or more inputs, caller and one or more outputs together comprise a generated PR.

4. The method of claim 2 wherein the semantically annotating the WIR based at least in part on the first ML API associated with the ML model code to generate the annotated WIR by querying the queryable KB comprises:
accessing the queryable KB; and
adding annotations to the PRs of the directed graph corresponding to the WIR by, beginning at each import process node of the directed graph, performing a forward traversal of PRs in the directed graph, and for each PR encountered in the forward direction (forward PR):
querying the queryable KB for first input annotations corresponding to the one or more input variables of the forward PR, for first output annotations corresponding to the one or more output variables of the forward PR, and adding the first input annotations and first output annotations to the forward PR; and
for each of the first input annotations, performing a backward traversal of PRs in the directed graph starting with the forward PR, and for each PR encountered in the backward direction (backward PR):
querying the queryable KB based on the first input annotations for second input annotations corresponding to the backward PR, and adding the second input annotations to the backward PR.

5. The method of claim 4 wherein the identifying, based at least on the annotated WIR and the first ML API, data from at least one data source that is relied upon by the ML model code when training the ML model comprises:
for each PR in the directed graph, determining feature variables comprising variables of the PR that are annotated as features and that correspond to a data selection or exclusion operation, and beginning with the PR of each determined feature variable, recursively traverse the directed graph backwards to identify the data from the at least one data source that corresponds to the feature variable.

6. The method of claim 5 wherein the determining the feature variables further comprises determining variables of the PR that are annotated as labels.

7. The method of claim 5 wherein the data from the at least one data source comprises data corresponding to at least one of: a column, a row or a cell of the at least one data source.

8. A machine learning data provenance tracking system, comprising:
a processor;
a derivation extractor component executed by the processor, the derivation extractor component being configured to receive machine learning (ML) model code, the ML model code using at least a first ML application programming interface (API) that when executed, generates and trains an ML model, the derivation extractor component further configured to determine a workflow intermediate representation (WIR) of the ML model code;
a queryable knowledge base (KB) stored in one or more memory devices, the queryable KB including:
a plurality of ML API annotations corresponding to the semantic identity of, and relationships between, inputs and outputs of operations provided by a plurality of ML APIs, including the first ML API; and
a table of operations corresponding to ML model code operations that perform data selection or exclusion operations;
a ML model code analyzer component executed by the processor, the ML model code analyzer being configured to semantically annotate the WIR based at least in part on the first ML API associated with the ML model code to generate an annotated WIR; and
a provenance tracker component executed by the processor, the provenance tracker component being configured to identify, based at least on the annotated WIR and KB query results, data from at least one data source that is relied upon by the ML model code when training the ML model.

9. The machine learning data provenance tracking system of claim 8, the derivation extractor component further configured to determine the WIR of the ML model code by:
building an abstract syntax tree (AST) based at least in part on the received ML model code;
generating a plurality of provenance relationships (PRs) based at least in part on relationships between nodes of the AST, wherein a PR comprises one or more input variables, an operation, a caller, and one or more output variables; and
composing a directed graph based at least in part on the plurality of PRs, wherein the WIR comprises the directed graph.

10. The machine learning data provenance tracking system of claim 9 wherein the generating the plurality of PRs based at least in part on the relationships between the nodes of the AST comprises:
traversing the AST starting at each root node of the AST and for each node of the AST that is not a literal or constant, determining an operation corresponding to the node, and recursively determining each one or more inputs, a caller and one or more outputs corresponding to the node, wherein the determined operation, one or more inputs, caller and one or more outputs together comprise a generated PR.

11. The machine learning data provenance tracking system of claim 9 wherein the ML model code analyzer component is further configured to semantically annotate the WIR by:
accessing the queryable knowledge base (KB); and
adding annotations to the PRs of the directed graph corresponding to the WIR by, beginning at each import process node of the directed graph, performing a forward traversal of PRs in the directed graph, and for each PR encountered in the forward direction (forward PR):
querying the queryable KB for first input annotations corresponding to the one or more input variables of the forward PR, for first output annotations corresponding to the one or more output variables of the forward PR, and adding the first input annotations and first output annotations to the forward PR; and
for each of the first input annotations, performing a backward traversal of PRs in the directed graph starting with the forward PR, and for each PR encountered in the backward direction (backward PR):
querying the queryable KB based on the first input annotations for second input annotations corresponding to the backward PR, and adding the second input annotations to the backward PR.

12. The machine learning data provenance tracking system of claim 11 wherein the provenance tracker component is further configured to identify data from at least one data source relied upon by the ML model code when training the ML model by, for each PR in the directed graph, determining feature variables comprising variables of the PR that are annotated as features and that correspond to a data selection or exclusion operation, and beginning with the PR of each determined feature variable, recursively traverse the directed graph backwards to identify the data from the at least one data source that corresponds to the feature variable.

13. The machine learning data provenance tracking system of claim 12 wherein the provenance tracker component determines the feature variables by determining variables of the PR that are annotated as labels.

14. The machine learning data provenance tracking system of claim 8 wherein the data from the at least one data source comprises data corresponding to at least one of: a column, a row or a cell of the at least one data source.

15. A computer-readable storage medium having program instructions recorded thereon that, when executed by at least one processor, perform a method, the method comprising:
receiving machine learning (ML) model code, the ML model code using at least a first ML application programming interface (API) that when executed, generates and trains an ML model;
determining a workflow intermediate representation (WIR) of the ML model code by:
building an abstract syntax tree (AST) based at least in part on the received ML model code;
generating a plurality of provenance relationships (PRs) based at least in part on relationships between nodes of the AST, wherein a PR comprises one or more input variables, an operation, a caller, and one or more output variables, wherein said generating the plurality of PRs comprises:
traversing the AST starting at each root node of the AST and for each node of the AST that is not a literal or constant, determining an operation corresponding to the node, and recursively determining each one or more inputs, a caller and one or more outputs corresponding to the node, wherein the determined operation, one or more inputs, caller and one or more outputs together comprise a generated PR; and
composing a directed graph based at least in part on the plurality of PRs, wherein the WIR comprises the directed graph;
semantically annotating the WIR based at least in part on the first ML API associated with the ML model code to generate an annotated WIR; and
identifying, based at least on the annotated WIR and the first ML API, data from at least one data source that is relied upon by the ML model code when training the ML model.

16. The computer-readable storage medium of claim 15 wherein the semantically annotating the WIR based at least in part on the first ML API associated with the ML model code to generate the annotated WIR comprises:
accessing a queryable knowledge base (KB) that includes ML API annotations corresponding to a semantic identity of, and relationships between, inputs and outputs of operations provided by a plurality of ML APIs, including the first ML API; and
adding annotations to the PRs of the directed graph corresponding to the WIR by, beginning at each import process node of the directed graph, performing a forward traversal of PRs in the directed graph, and for each PR encountered in the forward direction (forward PR):
querying the queryable KB for first input annotations corresponding to the one or more input variables of the forward PR, for first output annotations corresponding to the one or more output variables of the forward PR, and adding the first input annotations and first output annotations to the forward PR; and
for each of the first input annotations, performing a backward traversal of PRs in the directed graph starting with the forward PR, and for each PR encountered in the backward direction (backward PR):
querying the queryable KB based on the first input annotations for second input annotations corresponding to the backward PR, and adding the second input annotations to the backward PR.

17. The computer-readable storage medium of claim 16 wherein the identifying, based at least on the annotated WIR and the first ML API, data from at least one data source that is relied upon by the ML model code when training the ML model comprises:
for each PR in the directed graph, determining feature variables comprising variables of the PR that are annotated as features and that correspond to a data selection or exclusion operation, and beginning with the PR of each determined feature variable, recursively traverse the directed graph backwards to identify the data from the at least one data source that corresponds to the feature variable.

18. The computer-readable storage medium of claim 17 wherein the determining the feature variables further comprises determining variables of the PR that are annotated as labels.

19. The computer-readable storage medium of claim 17 wherein the data from the at least one data source comprises data corresponding to at least one of: a column, a row or a cell of the at least one data source.

20. The computer-readable storage medium of claim 17 wherein the semantically annotating the WIR based at least in part on the first ML API associated with the ML model code to generate an annotated WIR comprises:
querying a queryable knowledge base (KB), the queryable KB including:
a plurality of ML API annotations corresponding to a semantic identity of, and relationships between, inputs and outputs of operations provided by a plurality of ML APIs, including the first ML API, and
a table of operations corresponding to ML model code operations that perform data selection or exclusion operations.

* * * * *